United States Patent

[11] 3,571,518

[72] Inventors Elmer O. Chipman
North Arlington;
Robert J. McCarroll, Iselin; Seymour B. Weinberg, Old Bridge, N.J.
[21] Appl. No. 752,274
[22] Filed Aug. 13, 1968
[45] Patented Mar. 16, 1971
[73] Assignees said Weinberg assignor to Bell Telephone Laboratories, Incorporated
Murray Hill, N.J.;
said Chipman and McCarroll assignor to Western Electric Company, Incorporated
New York, N.Y.

[54] TELEPHONE ANSWERING SYSTEM
12 Claims, 20 Drawing Figs.

[52] U.S. Cl. 179/27
[51] Int. Cl. H04m 5/06
[50] Field of Search 179/27.25, 18.03, 18 (P&I), 51, 52, 53, 91, 94, 99, 49, 55

[56] References Cited
UNITED STATES PATENTS
3,341,664 9/1967 Leonard 179/27 (.25)
1,200,277 10/1916 Utter 179/53
2,041,090 5/1936 Saul et al. 179/51

*Primary Examiner*—Kathleen H. Claffy
*Assistant Examiner*—Randall P. Myers
*Attorneys*—R. J. Guenther and James Warren Falk

ABSTRACT: A multiple attendant position telephone switching system is arranged with switching circuitry responsive to the removal of an attendant's headset at any one position to permit an attendant at another position to answer calls that would otherwise be directed to the position from which the headset has been removed. The switching circuitry is arranged to recognize and to respond to the occupied or unoccupied status of the positions so as to interconnect unoccupied positions with adjacent occupied positions prior to interconnecting those positions with positions more remotely located. Occupied consoles may be selectively interconnected so that an idle attendant may assist a busy attendant on a one call basis under control of the assisting attendant.

INVENTORS E. O. CHIPMAN
R. J. McCARROLL
S. B. WEINBERG
BY Brendan A. Ward
ATTORNEY Patented March 16, 1971 3,571,518

20 Sheets-Sheet 7

Patented March 16, 1971 3,571,518

20 Sheets-Sheet 10

| LINE | UNOCCUPIED CONSOLES | GROUPED CONSOLES |
|---|---|---|
| 1 | C3 | C3 TO C2 |
| 2 | C2, C3 | C2 TO C1, C3 TO C4 |
| 3 | C2, C3, C4 | C3 AND C2 TO C1, C4 TO C5 |
| 4 | C2, C3, C4, C5 | C5, C4, C3, AND C2 TO C1 |
| 5 | C1 | C1 TO C2 |
| 6 | C1, C3 | C1 AND C3 TO C2 |
| 7 | C4, C5 | C5 AND C4 TO C3 |
| 8 | C1, C4 | C1 TO C2, C4 TO C3 |

TELEPHONE ANSWERING SYSTEM

BACKGROUND OF THE INVENTION

1. Field of the Invention

This invention relates generally to multiple position telephone switchboard systems and more particularly to switching equipment arrangements within such systems for automatically changing the control capability of certain positions in response to the occupied or unoccupied status of other positions.

2. Description of the Prior Art

The development of cordless attendant consoles has served to open a new dimension in the provision of centralized attendant controlled subscriber services. An example of such a service is a telephone answering bureau wherein calls to certain subscriber telephones are answered by an attendant at the bureau instead of by the called subscriber. Whereas in the older cord-type switchboards the attendant was required to physically insert a plug into a jack in order to handle a call on a particular line, it is now only necessary to operate a single key on the console to accomplish this function. The bulky plugs, cords, jacks and lamps inherent with cord switchboards have been replaced with compact illuminated keys thereby reducing the size of the switchboard considerably. In keeping with this compactness there is an ever-increasing demand for additional features which render the facilities even more convenient and flexible.

For example, due to variable traffic conditions it is often necessary for an attendant at one position to assist in the handling of calls which are directed toward some other position. In addition, situations frequently arise in which it is necessary for an attendant, or a group of attendants, to be absent from their assigned positions for arbitrary intervals of time. During these intervals, calls to the unattended consoles must be answered by an attendant at some other console, preferably by an attendant at an adjacent console.

The answering of calls on adjacent consoles whenever possible it important from an economical standpoint whenever the console positions are arranged to handle similar types of calls. For example, in telephone answering systems, in order to minimize the training of attendants, one group of consoles which are adjacent to each other may be arranged to serve calls for physicians while another group of adjacent consoles is arranged to serve calls to tradesmen. Obviously confusion results whenever an attendant trained to handle business calls is required to answer calls on a console arranged for physicians'lines. A further advantage of grouping adjacent consoles is that the line pickup keys on the unoccupied console ear easily operated by the assisting attendant, thus further reducing the physical effort involved in answering grouped calls.

In existing switchboard arrangements, in order to accomplish the interconnection or grouping between consoles it is necessary to manually operate one or more switches at the positions to be grouped. Under these arrangements the assisting attendant is involved in the interconnection procedure each time some other attendant enters or leaves the system. Since control of the grouping feature is with the assisting attendant the interconnection of positions can be accomplished only while that attendant is idle. In addition, upon returning to an assigned console an attendant cannot resume answering calls until the assisting attendant is free to release the interconnection feature. Thus during busy periods it has been found to be extremely cumbersome and at times impossible for attendants to leave their consoles, even for a few minutes.

An example of a most recent improvement in the grouping arrangements of consoles in a telephone answering bureau is disclosed in the R. R. Leonard U. S. Pat. No. 3,341,664, dated Sept. 12, 1967 . As set forth therein, an attendant at an occupied console operates one switch in order to group with all the unoccupied consoles between that console and the next occupied console. Although the interconnection system taught by Leonard obviates the necessity for switching operations to be performed at the unoccupied consoles whenever grouping is desired, the burden remains with the assisting attendant to initiate or to release the grouping feature. Since control of grouping in Leonard, as in other prior art interconnection systems, always flows from an occupied console to the unoccupied consoles, no provision is made for grouping a particular unoccupied console with the nearest occupied console. Also, no provision is made for changing the interconnection arrangement of the consoles while calls are being processed by the attendants. Thus, in present systems the flexibility of the grouping feature is severely limited.

In addition, as in prior art interconnection systems, the assistance or teaming function is dependent upon the operation of an assist key at the console requiring assistance. Under such systems, it it possible to interconnect a busy console with a second busy console without the attendant at the second console even being aware of the interconnection. In such a situation, confusion results in that the first attendant expects assistance from a second attendant who may also require assistance.

In view of the foregoing, an object of this invention is to provide a telephone switchboard interconnection system which may be simply and economically implemented so as to obviate the necessity for an assisting attendant to become involved in the activation of the interconnection feature.

Another object is to provide a multiple attendant answering system whereby calls to an unoccupied position may be immediately handled from the nearest occupied position.

Another object is to provide a multiple attendant answering system whereby calls may be handled from a position immediately upon the return of an attendant to that position.

A still further object is to provide a switchboard interconnection system whereby unattended positions always interconnect in a most economical pattern dependent upon the relative location of the attended positions.

A still further object is to provide a switch board interconnection system whereby busy attendants may be given discretionary assistance by adjacent attendants.

SUMMARY OF THE INVENTION

These and other objects are obtained in accordance with an exemplary embodiment of the invention wherein attendant consoles are interconnected with each other and with a switching network to form a multiple attendant answering bureau. Each console is equipped with a jack for the insertion of an attendant's headset. An interconnection control circuit associated with the consoles is operable to detect the removal of the headset from any console and to thereupon cause the interconnecting of that console with the next console located to the left containing an attendant's headset. In the event that the adjacent console on the left is also unoccupied the control circuit detects this fact and causes interconnection to be with the adjacent console on the right if that console is occupied. Thus, control of the interconnection or grouping function is dependent upon the occupied or unoccupied status of each individual console with the exact grouping configuration contingent upon the occupancy (as determined by the insertion or removal of the headset) of the remaining consoles. Whenever any console changes status, either becoming vacant or becoming occupied, the interconnection control circuit responds by rearranging the grouped configuration. However, if a position which is involved in the rearrangement is in the process of handling a call the rearrangement will be temporarily inhibited by then immediately enabled upon completion of that call.

In the situation where an attendant is busy, assistance may be given by an adjacent attendant by enabling a teamwork key at the adjacent console. The interconnection control circuit responds by interconnecting the desired consoles, under control of the assisting attendant, for one call only. Thus, the assisting attendant, by operating the teamwork key, may give assistance to a busy attendant only while it remains convenient to do so.

In accordance with another feature of the invention, a multiple attendant telephone answering bureau is arranged with a control circuit for interconnecting unoccupied attendant consoles with the next occupied console on the left.

In accordance with still another feature of the invention, a multiple attendant telephone answering system is arranged with a control circuit responsive to the occupied or unoccupied status of associated positions for grouping unoccupied positions with adjacent occupied positions prior to grouping those positions with positions more remotely located.

In accordance wit still another feature of the invention, a multiple attendant telephone answering bureau is arranged with a control circuit responsive to the operation of a switch at an occupied console for interconnecting that console in a teaming mode with a selected adjacent console on a one call basis.

DESCRIPTION OF THE DRAWING

The foregoing objects, features and advantages, as well as others of the invention, will be more apparent from the following description of the drawing in which.

It will be noted that FIGS. 2 through 19 employ a type of notation referred to an "detached contact" in which an "X" shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505—513.

Figure 2:
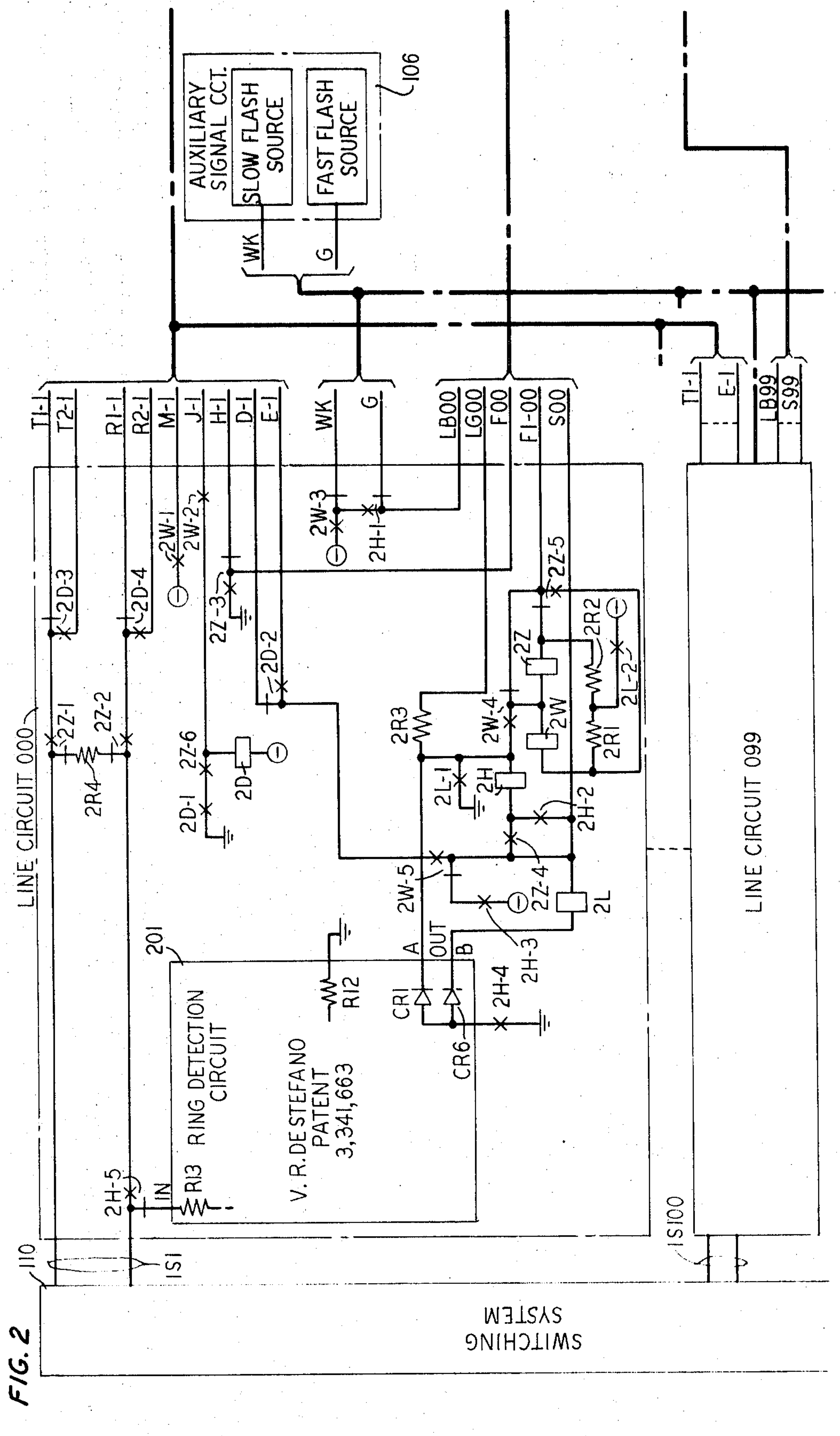
FIG. 2 through 19 are schematic drawing showing in greater detail the interrelation of the components of the exemplary embodiment.

It will also be noted that in order to simplify the disclosure and thus facilitate a more complete understanding of the embodiment, the relays, relay contacts and other electromechanical devices shown in FIGS. 2 through 19 have been given systematic designations, Thus, the number preceding the letters of each device correspond to the figure in which the control circuit of the device is shown. Thus, the coil of relay 2D is shown in FIG. 2. Each relay contact, either make, break or transfer, is shown with its specific contact number preceded by the designation of the relay to which it belongs. For example, the notation 2D–1 indicates contact number 1 of relay 2D, the coil of which is shown in FIG. 2.

In order to further facilitate an understanding of the invention, the description of the operation of the exemplary embodiment has been subdivided into a general description portion designated 1.0 and a detailed description portion designated 2.0. Section 1.0 and its subsections describe the invention in general terms with respect to FIGS. 1 and 21. Section 2.0 and its subsections describe the invention in detail with respect to FIGS. 2 through 19.

1.0 GENERAL DESCRIPTION

The present invention is illustrated in a telephone answering bureau wherein the lines which are to be answered are extended through a switching system to individual consoles at the answering bureau. One such switching system is disclosed in the M. E. Krom U.S. Pat. No. 3,002,054, issued Sept. 26, 1961. It is to be understood, however, that the present invention is not limited to use with such a system but may, in fact, be utilized with other types of systems.

Figure 1:
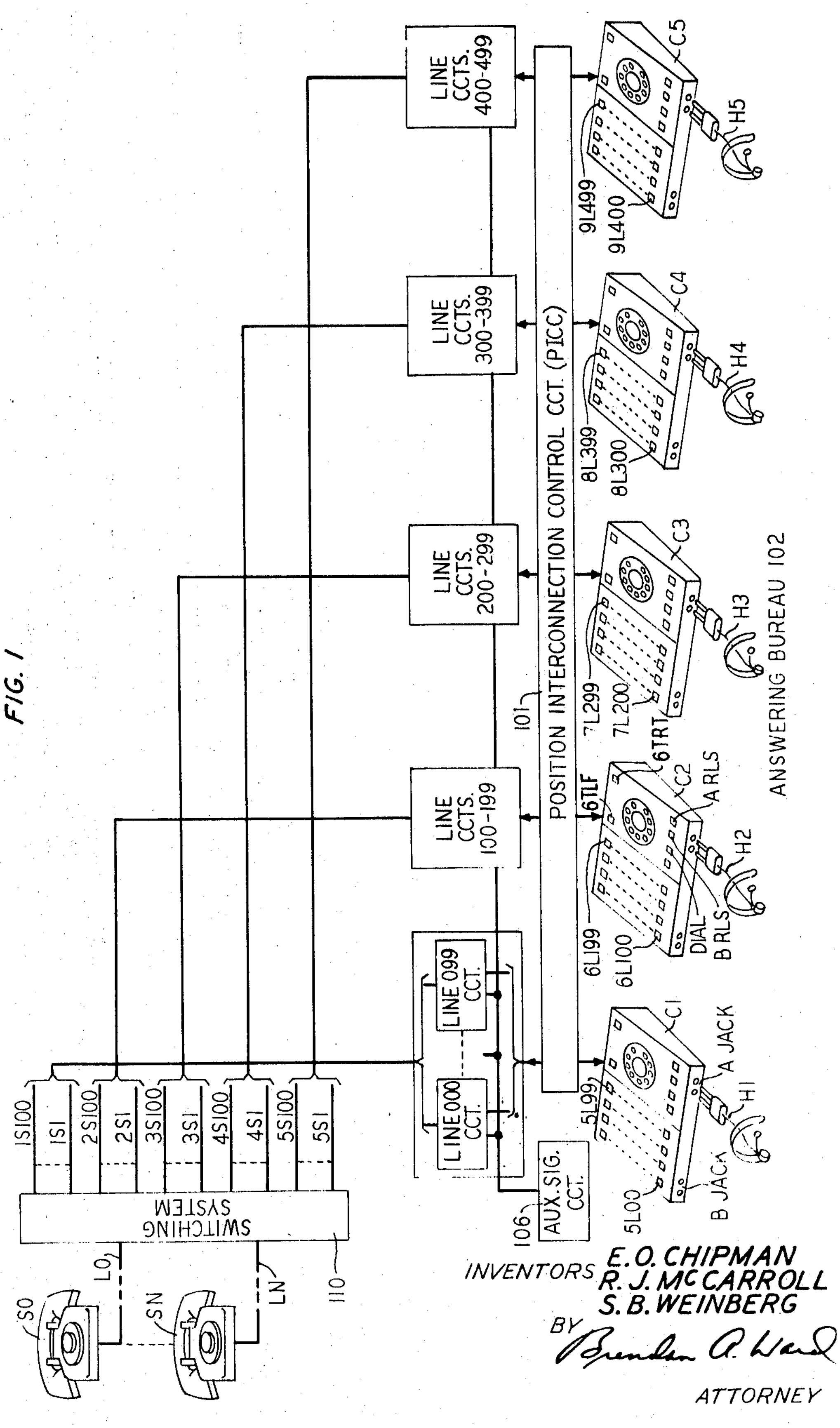
FIG. 1 is essentially a block diagram showing the interrelation of the exemplary embodiment of the invention.

The invention is particularly concerned with apparatus in position interconnection control circuit (PICC) 101 which is represented by the block shown in heavy lines on FIG. 1. The switching system and the other apparatus in the answering bureau are neither shown nor described in detail herein except when necessary for a complete understanding of the invention.

Referring now to FIG. 1, stations SO through SN, which are arranged to be answered from answering bureau 102, are shown as being connected to switching system 110 by lines LO through LN. Switching system 110 is shown as being terminated at the answering bureau 102 in line circuits 000 to 499, each of which is connected through position interconnection control circuit 101 to one of the telephone answering consoles C1 through C5.

For purposes of illustration it is assumed that the attendants' headsets H1 through H5 are all connected to jacks on consoles C1 through C5, respectively. Under this condition, a call to any subscriber station results in the activation of the line circuit associated therewith at the answering bureau 102. For example, a call to station SO activates line circuit OOO thereby illuminating lamp 5LOO as an indication to the attendants, that a call is present on line LO. Accordingly, since an attendant is currently available at console C1, as determined by the status of the headset H1, the call may be answered by depressing illuminated key 5LOO. In similar manner, calls incoming from any other station may be answered from the console associated with the called station. Position interconnection control circuit (PICC) 101 is arranged, in the manner to be more fully detailed hereinafter, to monitor the status of the attendant headsets and to allow incoming calls to be answered only by the attendant occupying the console to which the called station is associated. In addition, the PICC 101 allows an attendant to handle only one call at a time, thereby preventing the inadvertent interconnection of subscriber lines.

Assuming now that an attendant at console C3 removes the headset therefrom and that thereafter a call directed to a subscriber's telephone served by console C3 requires answering service. Under such a condition, without the provision of the interconnection or grouping feature an attendant at some other console would be required to become disassociated from that console and then become associated with the unoccupied console C3 in order to handle the call. However, PICC 101, upon recognizing the unoccupied status of console C3, is arranged, in the manner to be more fully detailed hereinafter, to group console C3 with the next occupied console on the left, which in this case is console C2. Answer control is thereby extended from console C3 to console C2 so as to allow the attendant at console C2 to handle the call without physically moving to console C3. Upon the reconnection of the attendant headset to console C3, PICC 101 immediately returns answer control thereto. However, in the event assistance is currently in the process of being rendered from console C2, the PICC 101 is arranged to allow the termination of such assistance prior to returning the answering control to console C3.

In the situation where consoles C2 and C3 are both unoccupied, PICC 101, in the manner to be more fully detailed hereinafter, only extends answering supervision of console C2 to C1. Since, as discussed previously, it is advantageous to group adjacent consoles, PICC 101, upon determining the occupied status of console C4, groups console C3 therewith. Thus, a call requiring answering service from console C3 is handled from console C4, while a call directed to console C2 is handled from console C1. In order to better illustrate this preferential grouping arrangement a few examples of typical console groupings is provided in FIG. 21.

Figures 20, 21:
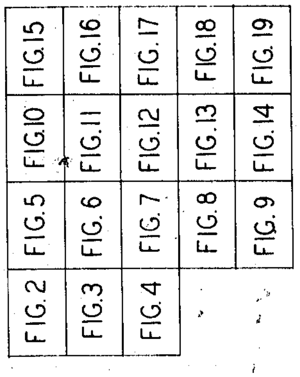
FIG. 20 shows the manner in which the other figures should be arranged.
FIG. 21 shows a chart of the grouping configurations achieved when certain consoles become unoccupied.

As will be observed from FIG. 21, line 3, console C4 is grouped to console C5 (instead of to console C1) since console C3 is also unoccupied and console C5, which is adjacent to console C4, is occupied and therefore more readily available. As also will be observed from line 3, console C3 is grouped to console C1 since adjacent console C4 is also unoccupied.

Position interconnection control circuit 101 dynamically follows each call in progress and the status of each attendant's headset so as to rearrange the interconnection immediately upon any change in the number or the position of available attendants. However, as discussed previously, when a call is in progress through a console, the grouping arrangements for that console will not be changed until that call is terminated. For example, as shown in FIG. 21, line 4, when the attendant at console C1 is the only available attendant, all other consoles are grouped thereto. Under these conditions, a call incoming to console C3 is interconnected by the PICC 101 through console C2 and handled from console C1. In the event that a is connected to console C4 during the progress of this call, so that both consoles C1 and C4 are available to handle calls, PICC 101 removes the previously grouped console C4 from console C1 and enables the interconnection of console C5 with C4. Accordingly, even though console C1 is engaged in the process of handling a call, the grouping arrangement between consoles C4 and C1 is changed so as to allow console C4 to handle calls immediately upon insertion of the headset without waiting for console C1 to become idle. PICC 101, however, maintains consoles C2 and C3 grouped with console C1 until the completion of the call, thereby preventing the interruption of service on the call which is currently in progress. Immediately upon termination of the call, unoccupied console C3 becomes associated with occupied console C4 as shown in FIG. 21, line 8.

When an idle attendant desires to assist an adjacent busy attendant in a teaming fashion, a teaming key, such as key TLF or key TRT, is operated from the assisting attendant's console. The PICC 101 responds in the manner to be more fully detailed hereinafter to this request by interconnecting the assisting attendant's console with the secondary answering capability of the busy attendant's console. Under this condition a call incoming on the busy console may be answered from the idle console by the attendant associated therewith. However, as will be more apparent from that which is contained hereinafter, the teaming interconnection is operative in one direction only. Therefore, when the busy attendant becomes idle, assistance cannot be returned to the assisting attendant unless the teaming key is operated at the now idle console. In addition, the PICC 101 is arranged to allow only one teaming call and accordingly disconnects the consoles upon completion of that call. The assisting attendant therefore selectively establishes the teamwork interconnection by reoperating the teamwork key each time assistance is given.

2.0 DETAILED DESCRIPTION

FIGS. 2 through 19 have been arranged as shown in FIG. 20 to facilitate an understanding of the detailed description as contained herein. For purposes of explanation we shall first assume that all the attendants' headsets. FIG. 1, H1 through H5 are connected to the A jacks on consoles C1 through C5, respectively, Under this condition, a call incoming on line circuit 000 is answered from console C1 by the attendant assigned thereto. In addition, in order to illustrate the grouping features of the instant arrangement, it will then be assumed that the attendant at console C3 removes the headset therefrom thereby automatically enabling the position interconnection control circuit (PICC) 101 to group console C3 to console C2. While the consoles are thus grouped a call incoming on line circuit 200, which in the normal situation could only be handled from console C3, will be answered from console C2. Also, in order to highlight additional features of the instant embodiment, numerous other grouping arrangements will be described in detail.

It should be noted at this point that in order to simplify the disclosure and to eliminate undue repetition, line circuits 001 through 499 have not been shown in detail. However, each of these circuits functions substantially similar to the corresponding line circuit 000, which is shown in detail in FIG. 2.

2.1 Incoming Call via Line Circuit 000

Referring now to fig. 2, a call incoming to the answering bureau from central office 110 over line 1S1 is extended to ring detection circuit 201 which may be advantageously arranged in any one of the well-known configurations to provide a ground at the output when ringing is detected at the input. One such arrangement is described in V. R. De Stefano U.S. Pat No. 3,341,663 dated Sept. 12, 1967. Accordingly, upon the application of ringing to line 1S1, ring detection circuit 201 provides a ground on output leads A and B. Ground is thereby extended from output lead A, through resistor 2R3 and over lead LG00 to console C1, FIG. 5, to one side of the 5L00 lamp therein. At the same time a source of fast flash potential, which is not shown in detail but which may comprise any number of configurations well known in the art for the illumination of a signalling lamp at a predetermined frequency, is extended from auxiliary signal circuit 106, FIG. 2, lead G, through released break contact 2H–1 and over the LB00 lead to lamp 5LOO in console C1, FIG. 5 which is thereby energized in a flashing manner.

Figure 10:
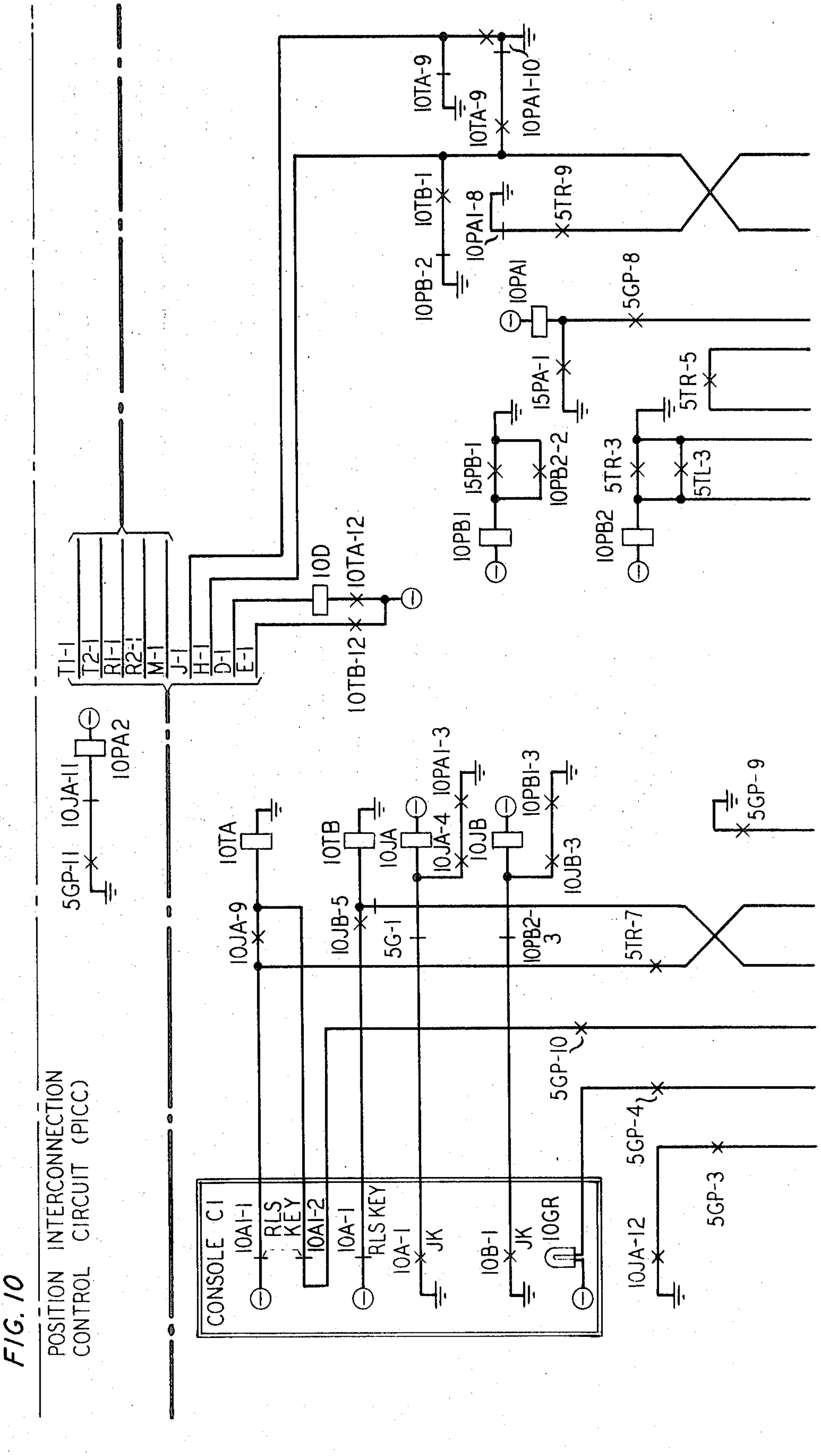

Since, as set forth previously, the attendant's headset is connected to the A jack of console C1, relay 10JA, FIG. 10, is operated from ground via enabled make contact 10A–1 of the A jack, released break contact 5G–1 and through the winding of relay 10JA to battery. The operation of relay 10JA operates relay 5J, FIG. 5, from ground through enabled make contact 10JA–3. As will become more apparent from that which is contained hereinafter, the status of the "J" relays associated with each console, either operated or released, control the status of the grouping function for each console.

The enabling of relay 10JA also enables relay 10TA from battery through released break contact 10A1–1 of the release key, through enabled make contact 10JA–9 and through the winding of relay 10TA to ground. The enabling of relay 10TA extends a ground from released break 10PA1–10 and enabled make contact 10TA–9 over the H–a lead, FIG. 10, to line circuit 000, FIG. 2, through released break contact 2Z–3 in the line circuit and over the FOO lead to the 5LOO key in console C1, FIG. 5.

The attendant, upon recognizing a line requiring service, operates the 5LOO key thereby causing ground, which has been extended thereto via the H–1 and FOO leads, to be further extended over the F1–OO lead to FIG. 2, and through released break contact 2W–4 to the winding of relay 2W and through released break contact 2Z–5 to the winding of relay 2Z. Operation of the 5LOO key also extends battery over lead SOO from console C1, FIG. 5, to line circuit OOO, FIG. 25 and through the winding of the 2L relay to the ground present on output lead B of the ring detector circuit 201. The enabling of relay 2L extends battery from enabled make contact 2L–2 and resistor 2R1 to the winding of relay 2W. Relay 2W thereupon operates to ground which is present on the other side of the winding as previously discussed and locks operated to ground through enabled make contacts 2L–1 and 2W–4. Relay 2Z remains normal at this time since ground is present on both sides of the winding.

Figure 5:
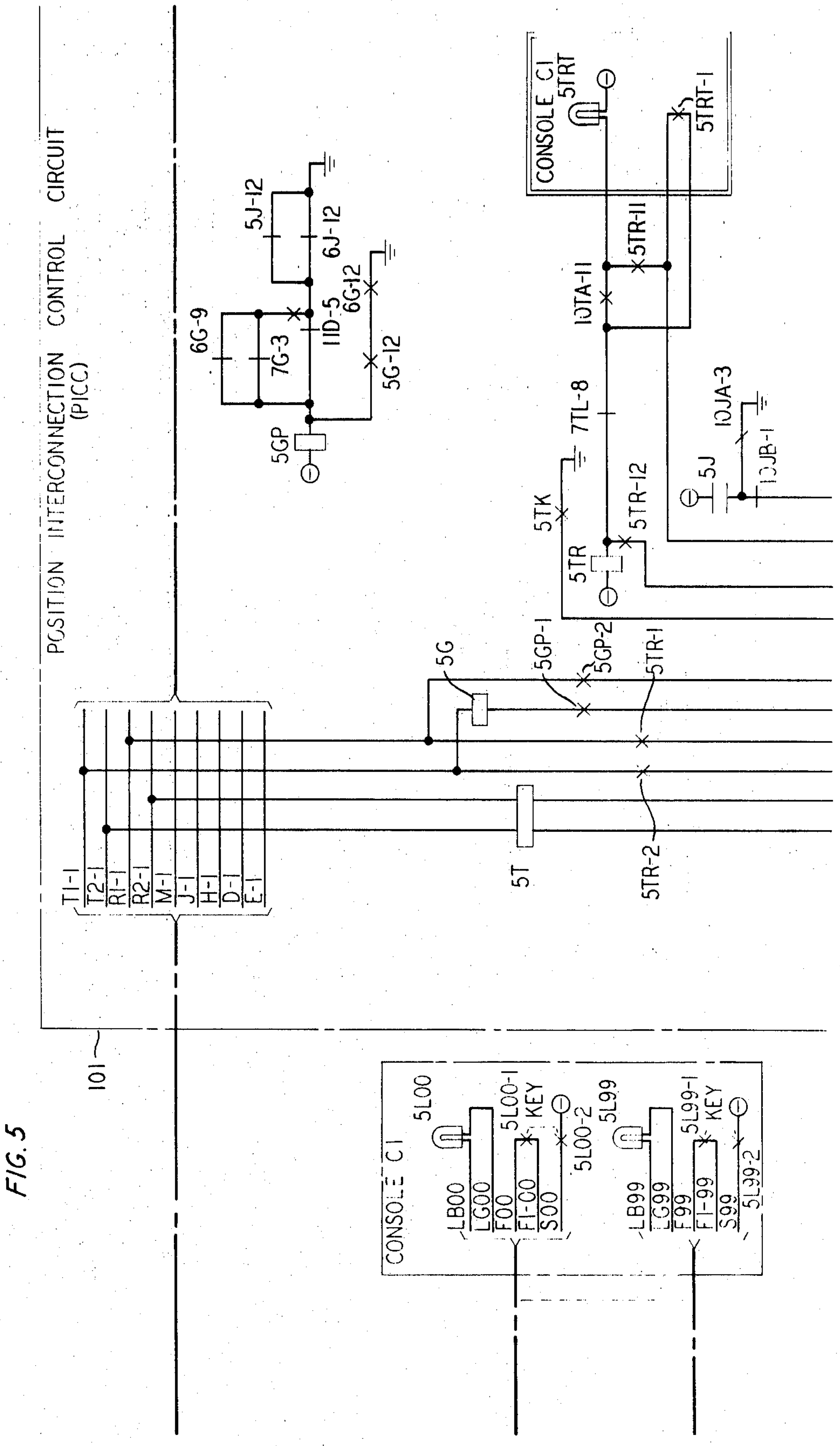

The release of the 5LOO key by the attendant at console C1, FIG. 5, removes ground from the F1–OO lead of line circuit OOO, FIG. 2, thereby removing the shunt ground and enabling the operation of relay 2Z from battery through enabled make contact 2L–2 and resistor 2R2. The enabling of relay 2Z enables the operation of relay 2H from ground which is extended through enabled make contact 2L–1 and the winding of the relay to battery through make contacts 2Z–4 and 2W–5, released break contact 2D–2 and lead D–1 from FIG. 10, through the winding of relay 10D and enabled make contact 10TA–12. Relay 10D also operates at this time over the previously described operate path.

Figure 15:
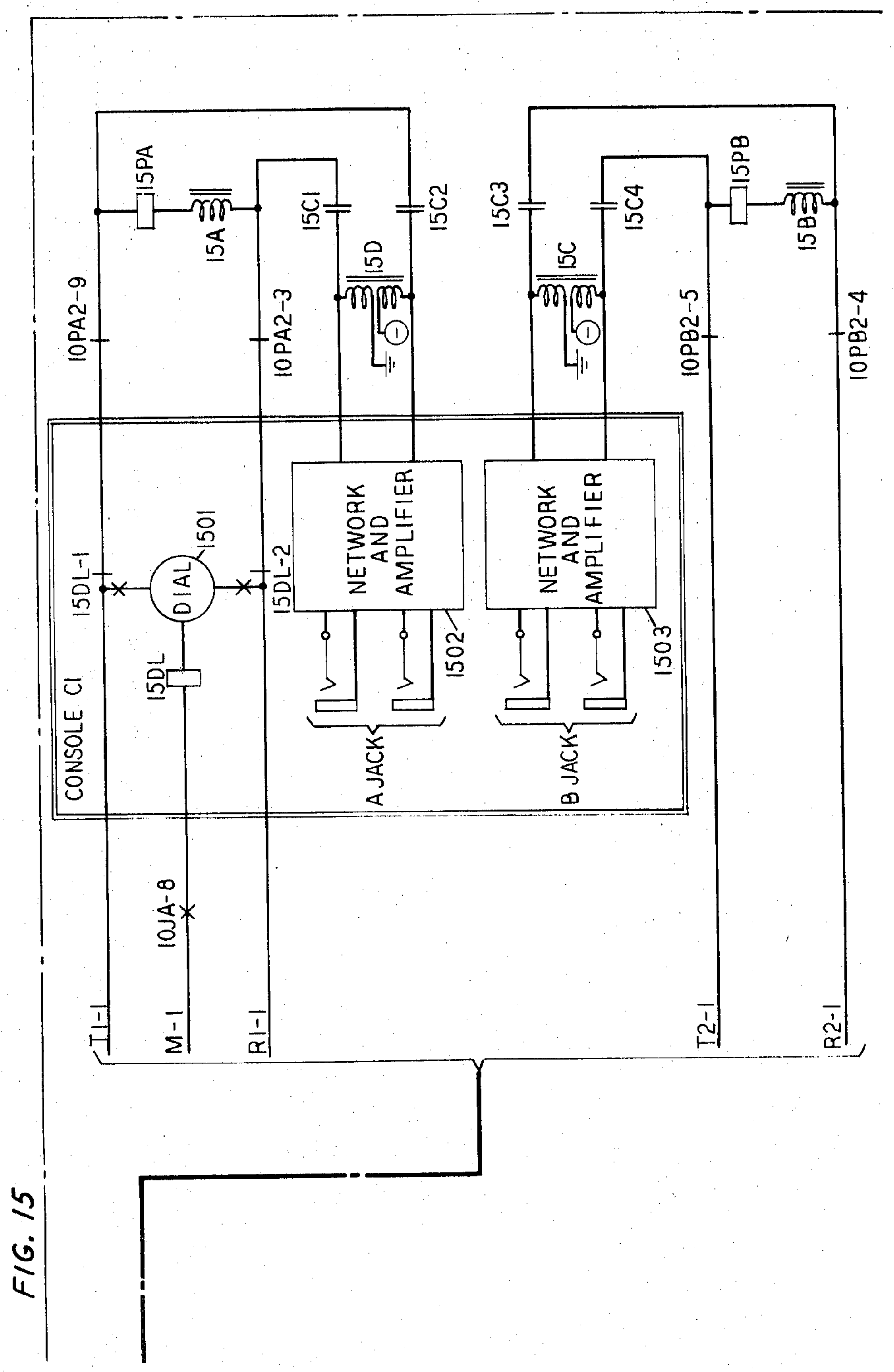
Figure 16:
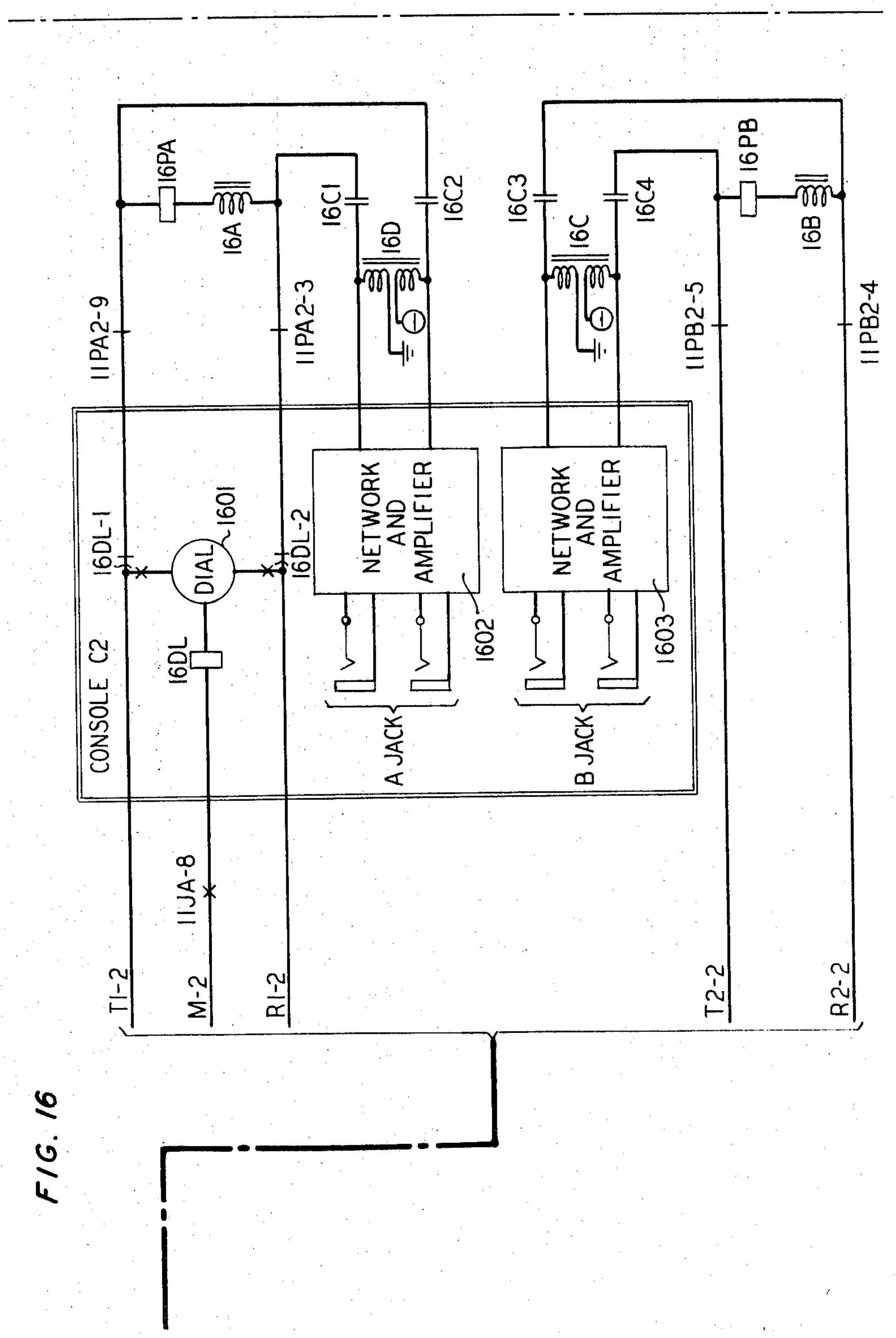
Figure 17:
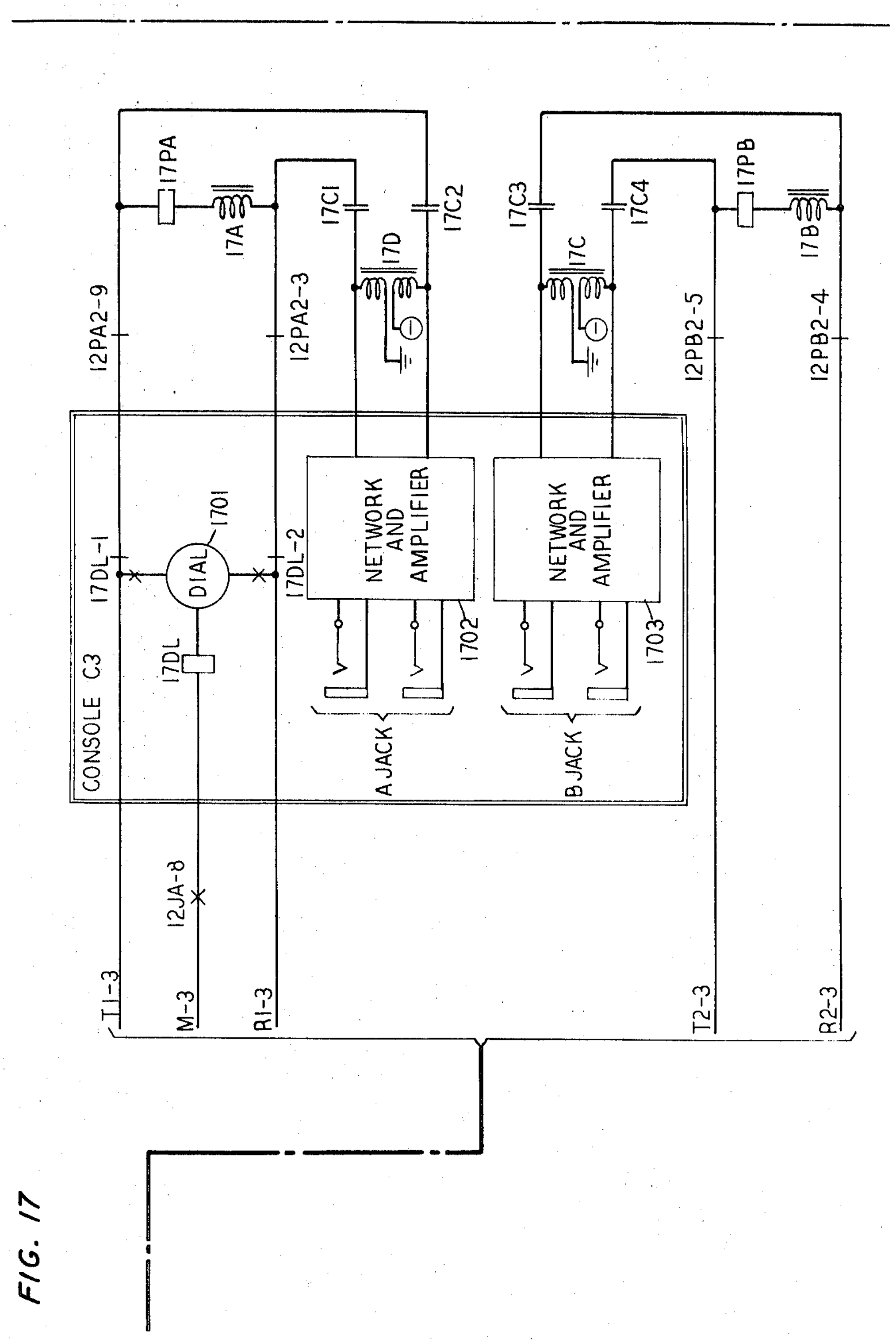
Figure 18:
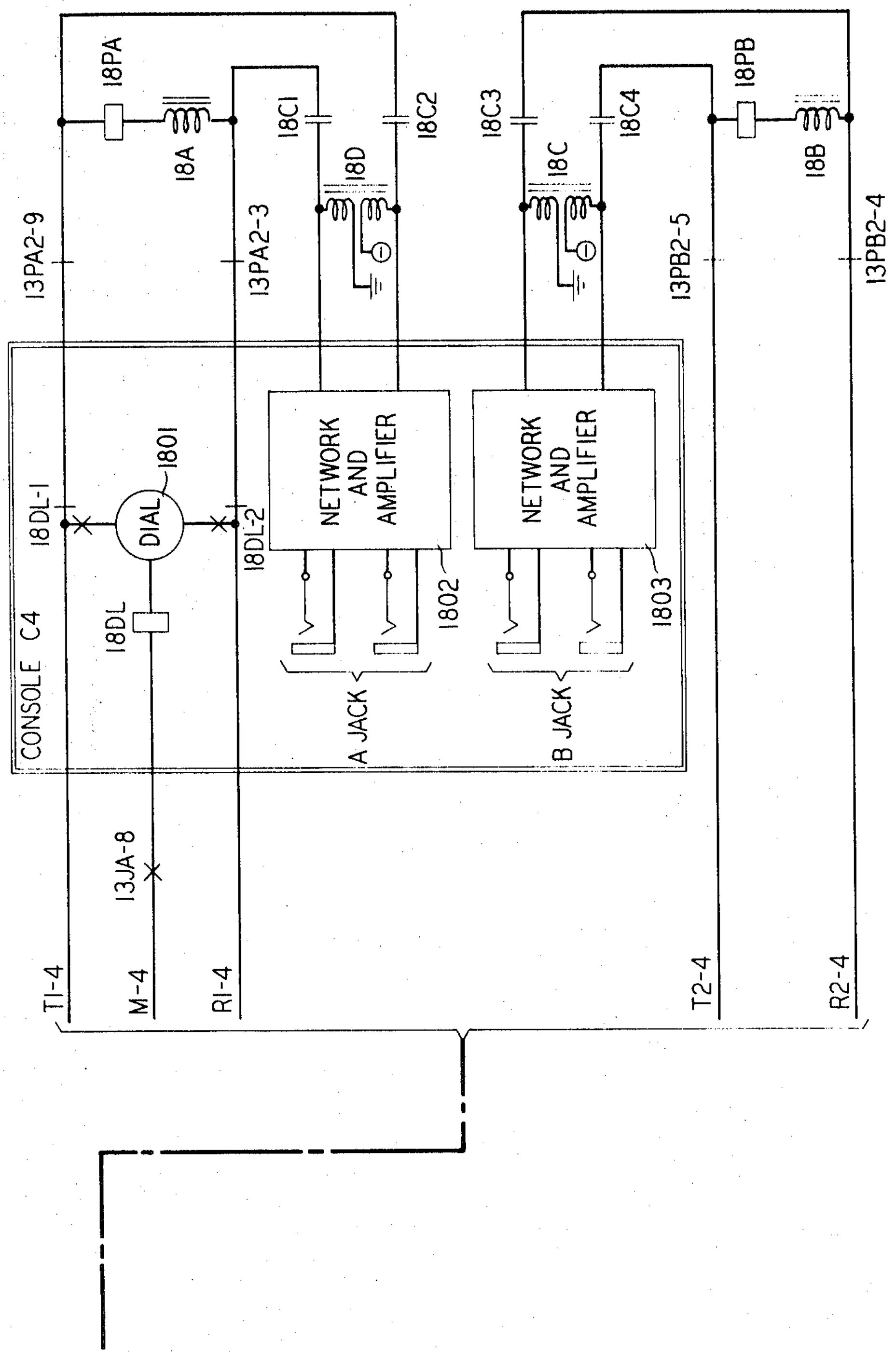
Figure 19:
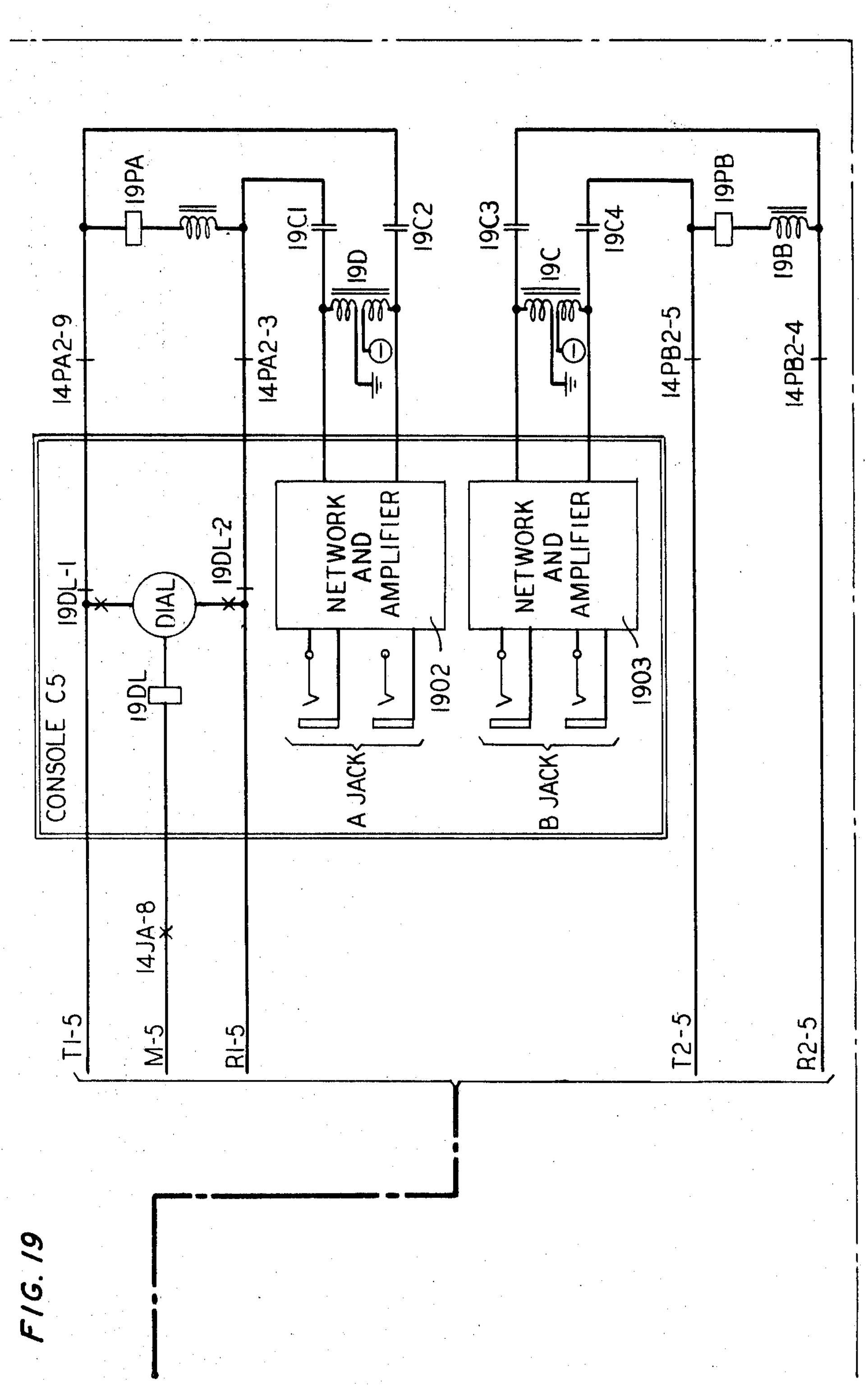

Returning now to FIG. 2, the enabling of relay 2H provides a holding ground for ring detection circuit 201 through enabled make contact 2H–4 and also extends incoming line 1S1 from central office 110 through enabled transfer contact 2H–5 and enabled make contacts 2Z–1 and 2Z–2, released break contacts 2D–3 and 2D–4 over leads T1–1 and R1–1 through the PICC circuit 101 to FIG. 15 and through released break contacts 15DL–1, 15DL–2, 10PA2–9 and 10PA2–3, capacitors 15C1 and 15C2 to console C1 and via network 1502 to the attendant's headset connected to the A jack. Talk battery is supplied to the attendant's headset via inductor 15D. Relay 15PA is enabled at this time from central office battery which is extended over leads T1–1 and R1–1 and the 15A inductor from switching system 110. The attendant at console C1 is thereby in telephonic communication with the sybscriber's line which is extended through the switching system 110 and over line 1S1 and connected through the PICC circuit 101 to the headset connected to console C1.

Turning now to FIG. 10, the enabling of relay 15PA enables the operation of relay 10PA1 from ground through enabled make contact 15PA–1. The operation of relay 10PA1 transfers ground lead H–1 and lead J–1 via enabled transfer contact 10PA1–10. It will be remembered that it was the ground which had been extended over lead H–1 and through the key 5LOO to the line circuit OOO that enabled the operation of the line circuit so as to extend the call from the central office through the PICC 101 circuit to the attendant's headset. Accordingly, removal of the ground from lead H–1 during the progress of the call inhibits any other line circuit served by console C1 from being selected by an attendant. Also, as will become more significant from that which is to follow, ground is removed from the H–1 lead whenever the attendant's headset is removed from console C1.

Summarizing briefly at this point, a call incoming over line 1S1 has been extended through line circuit 000, PICC 101 and console C1 to the attendant's headset connected thereto. Communication between the attendant at console C1 and the calling party is thereby possible.

2.2 Grouping of Console C3 to Console C2

Figure 12:
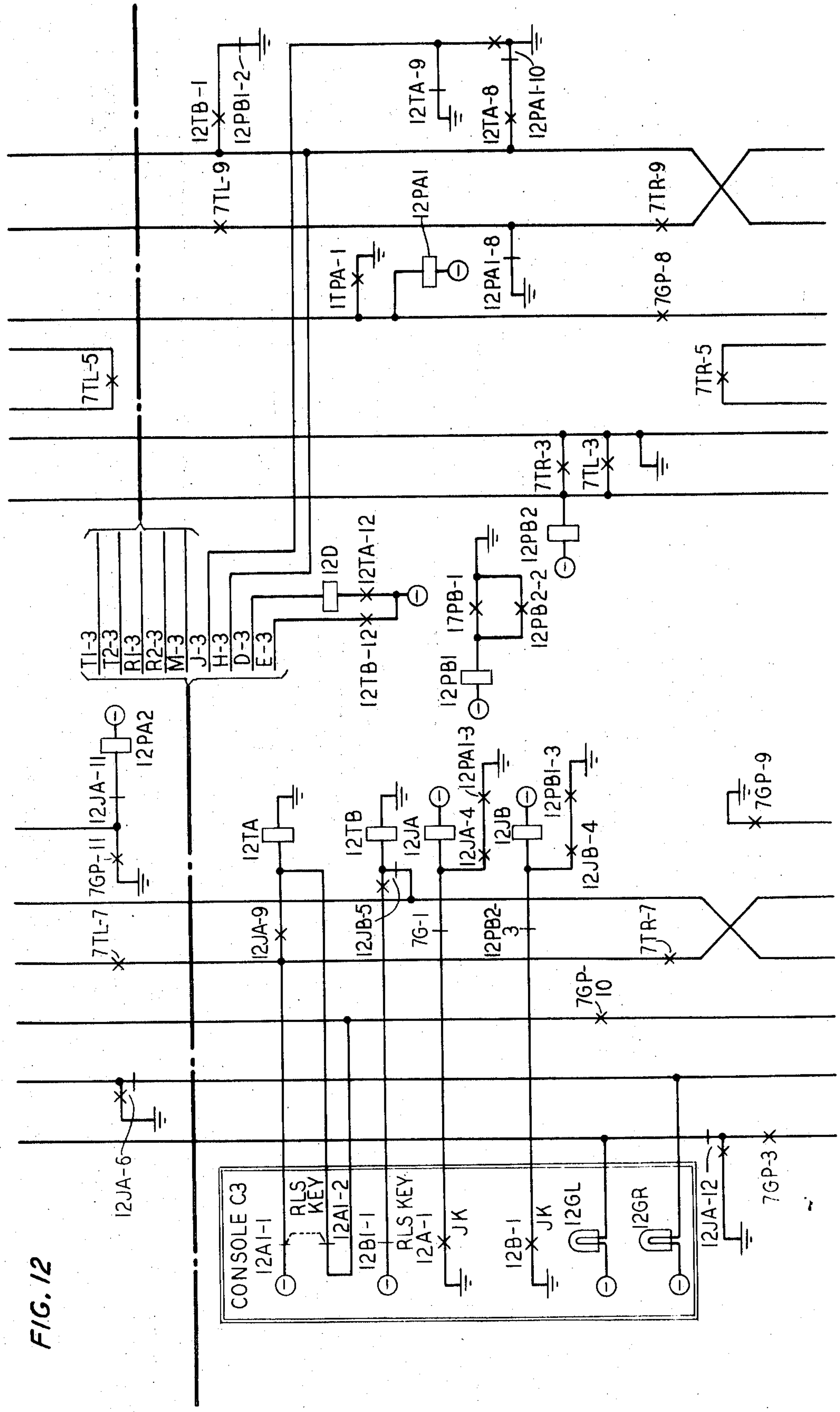
Figure 13:
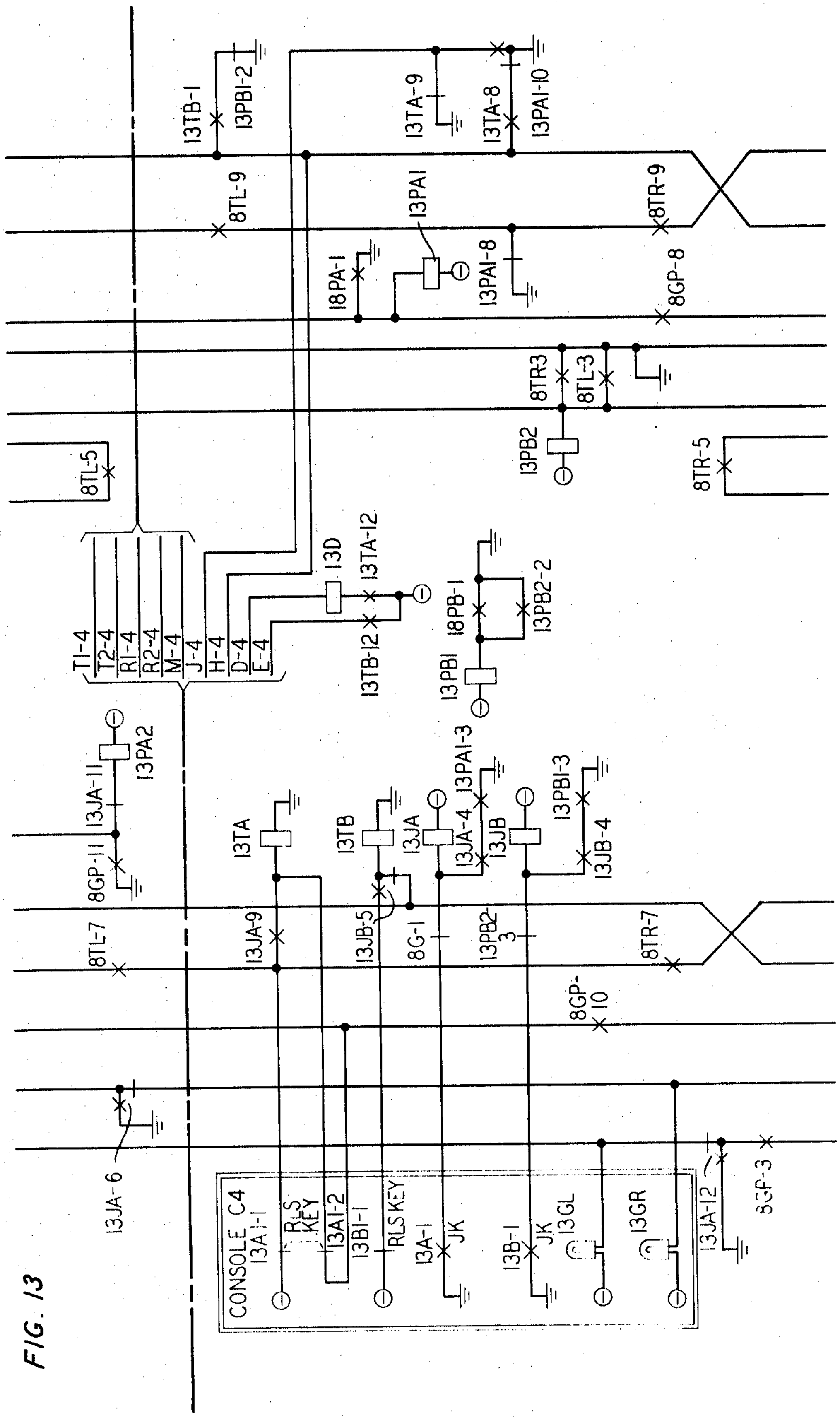
Figure 14:
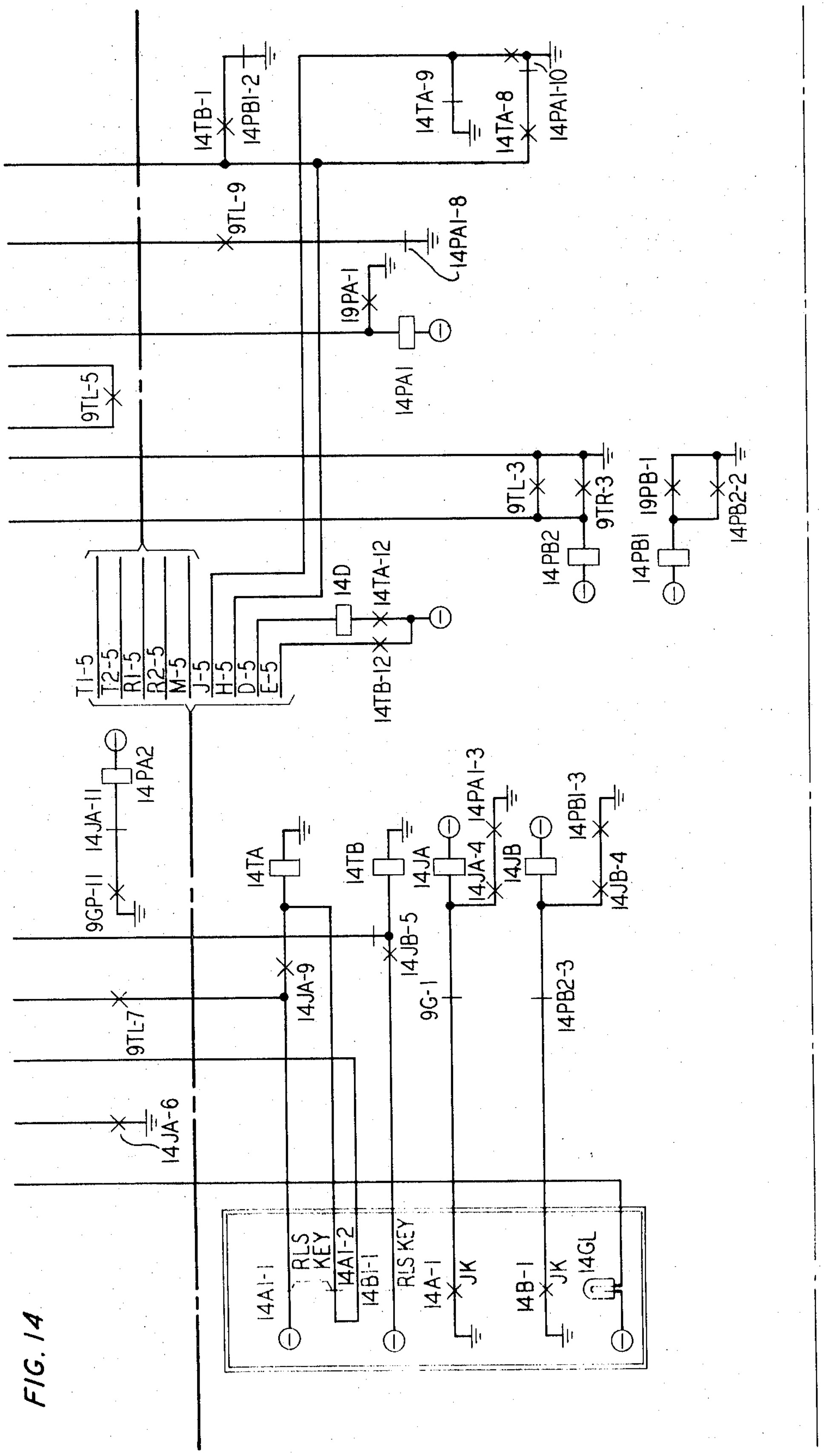

Referring now to FIG. 12, it will be assumed that the attendant at console C3 removes the headset from the A jack. Accordingly, relay 12JA releases in an obvious manner, thereby releasing relay 12TA also in an obvious manner. Relay 12JA releasing, also releases relay 7J, FIG. 7, via released make contact 12JS–3. As previously noted, it is the status of the "J" relays which determines the grouping arrangement as will be move apparent from that which is to follow.

Figure 6:
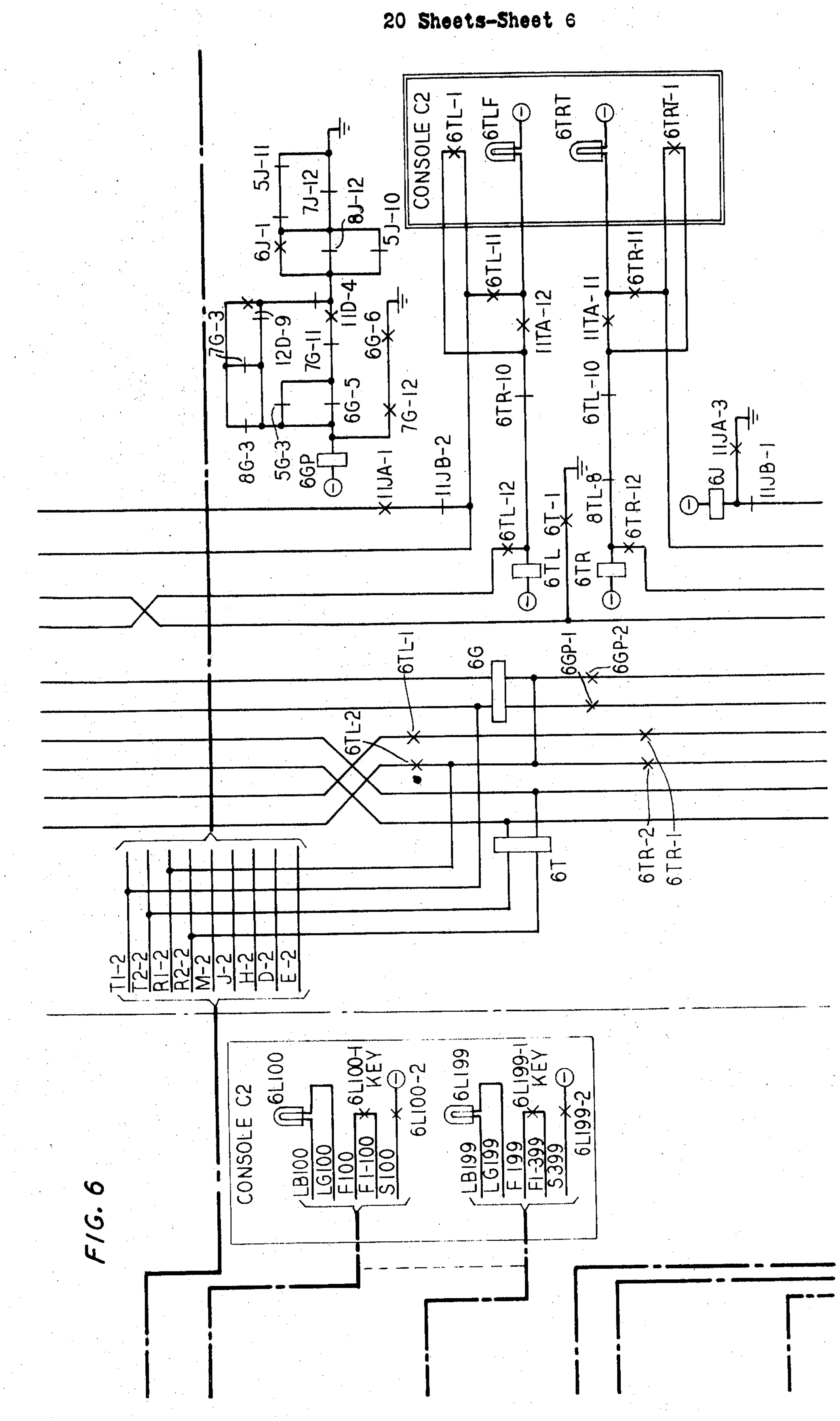

Turning now to FIG. 6, the release of relay 7J, the "J" relay associated with console C3, extends ground through released break contact 7J–12, enabled make contact 6J–1, released break contacts 11D–4 and 12D–9 to battery through the winding of relay 6GP. The enabling of relay 6GP enables the operation of relay 12PA2 from ground through enabled make contact 6GP–9, FIG. 11, and released break contact 12JA–11 to battery through the winding of relay 12PA2. Relay 12PA2 operating opens the communication path, FIG. 17, for the attendant's headset at console C3, via enabled break contacts 12PA2–9 and 12PS2–3. The significance of this operation will be more apparent from that which is contained hereinafter.

Turning again to FIG. 11, ground is also extended through enabled make contacts 11JA–12 and 6GP–3 to lamp 12GL, in console C3, FIG. 12, and through the lamp to battery. Illumination of the 12GL lamp on console C3 provides an indication that console C3 is "grouped left" to console C2. In this mode of operation a call incoming over any line circuit served by console C3, such as line circuit 200 shown in FIG. 3, may be answered from the attendant associated with console C2 in a manner that will be more apparent from that which is contained hereinafter.

Returning again to FIG. 11, battery is extended from console C2 via released break contact llA1–1 of the RLS key, enabled make contact 11JA–9, released break contact 11A1–2 of the RLS key and enabled make contact 6GP–10 to FIG. 12 and through released break contact 12A1–2 of the RLS key to ground through the winding of relay 12TA. The enabling of relay 12TA provides a ground on lead H–3 through released break contact 12PA1–10 and enabled make contact 12TA–8. As detailed previously for line circuit 000, ground on the H–3 lead is extended through the line circuits, FIG. 3, and lead F00 to the console C3, FIG. 7, thereby providing answering supervision on console C3 from console C2.

Figure 3:
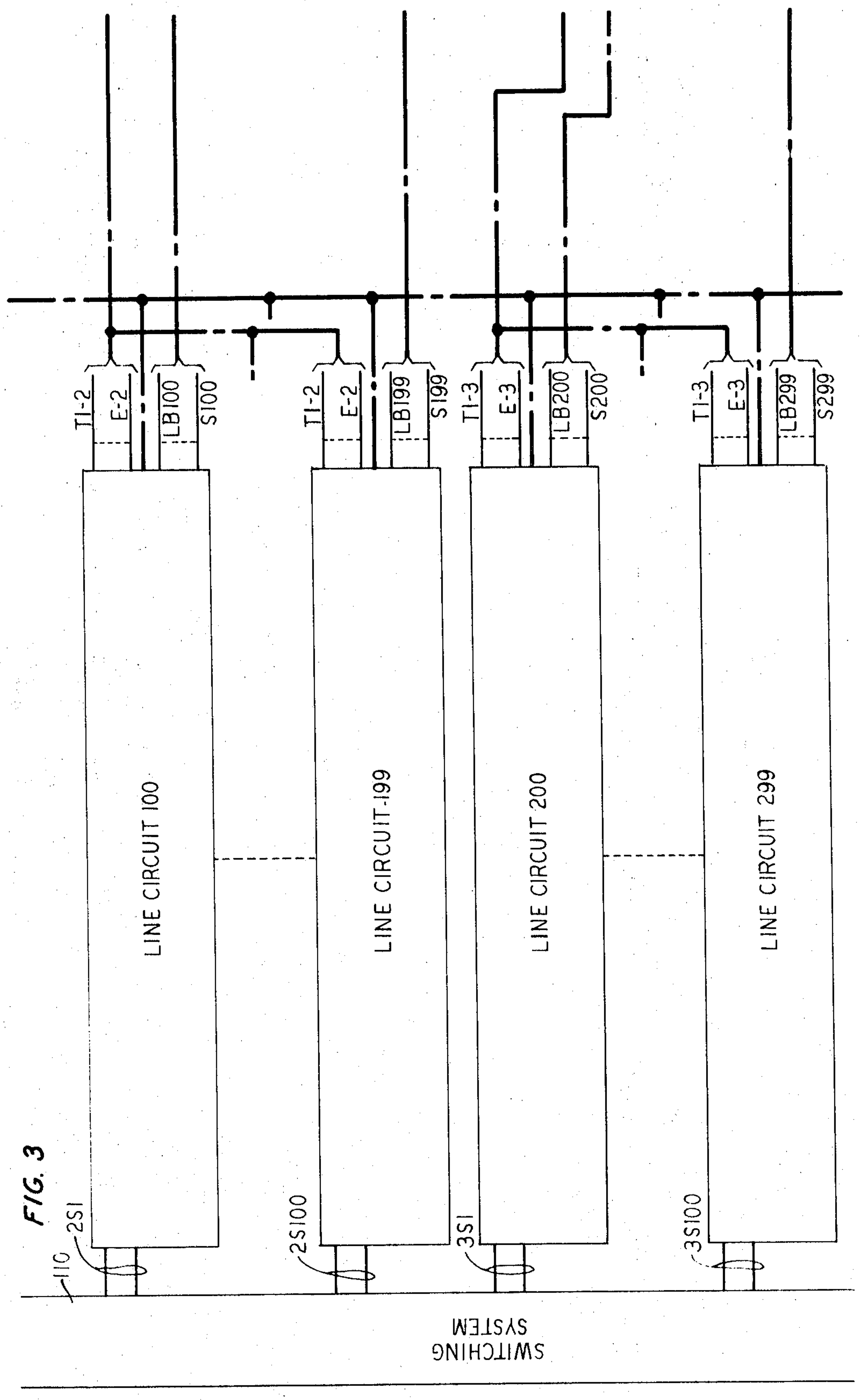
Figure 4:
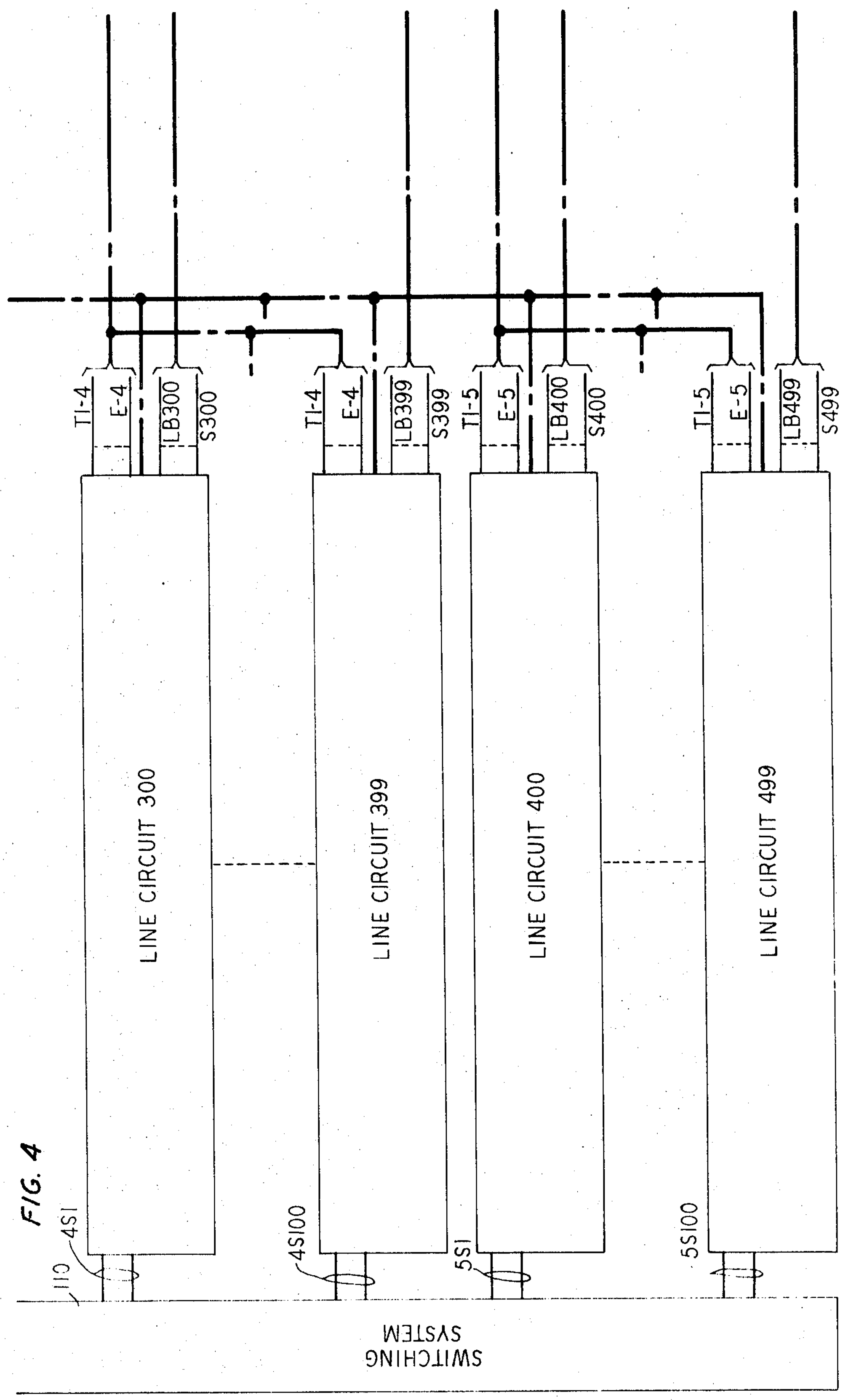
Figure 7:
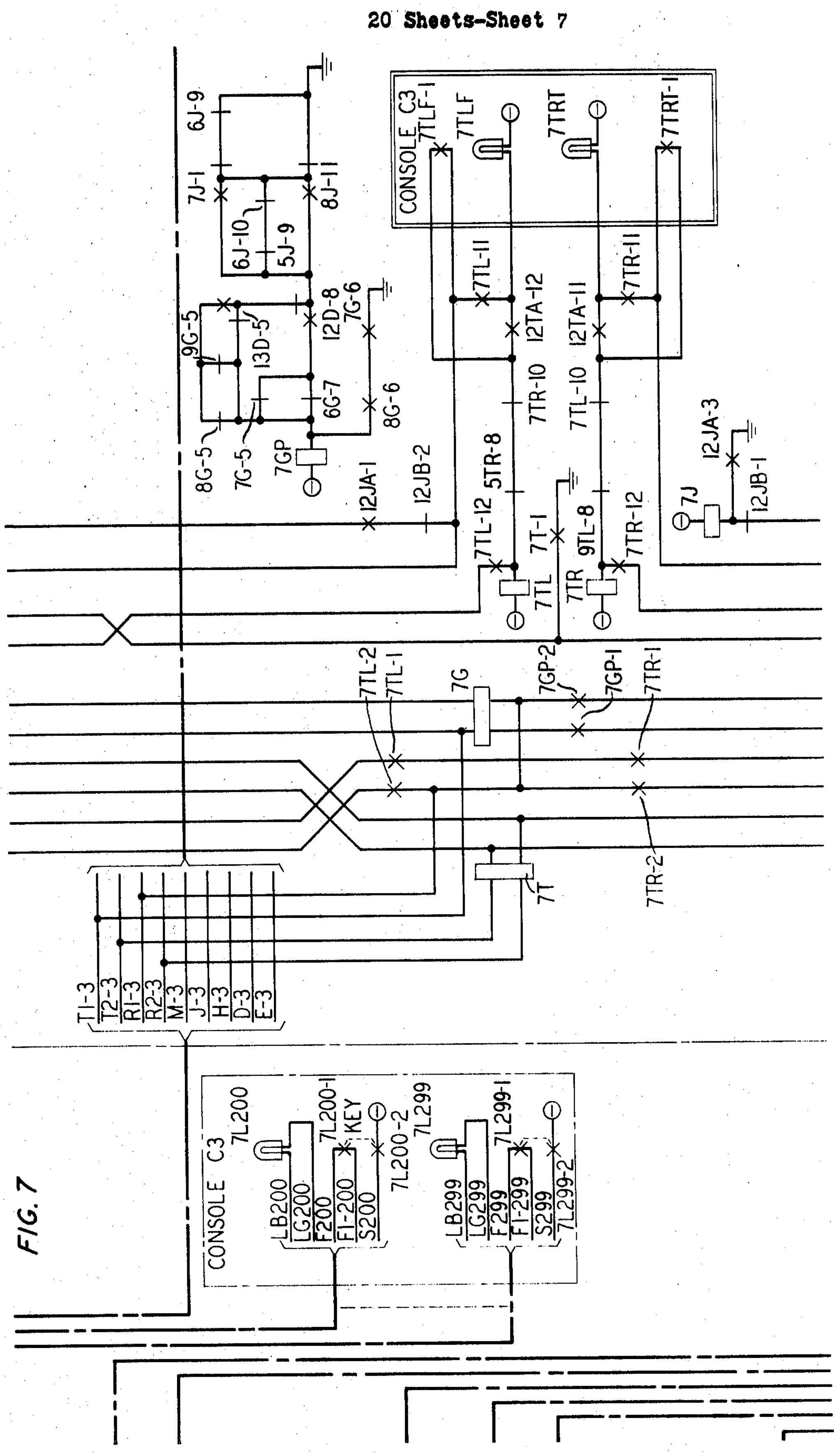
Figure 8:
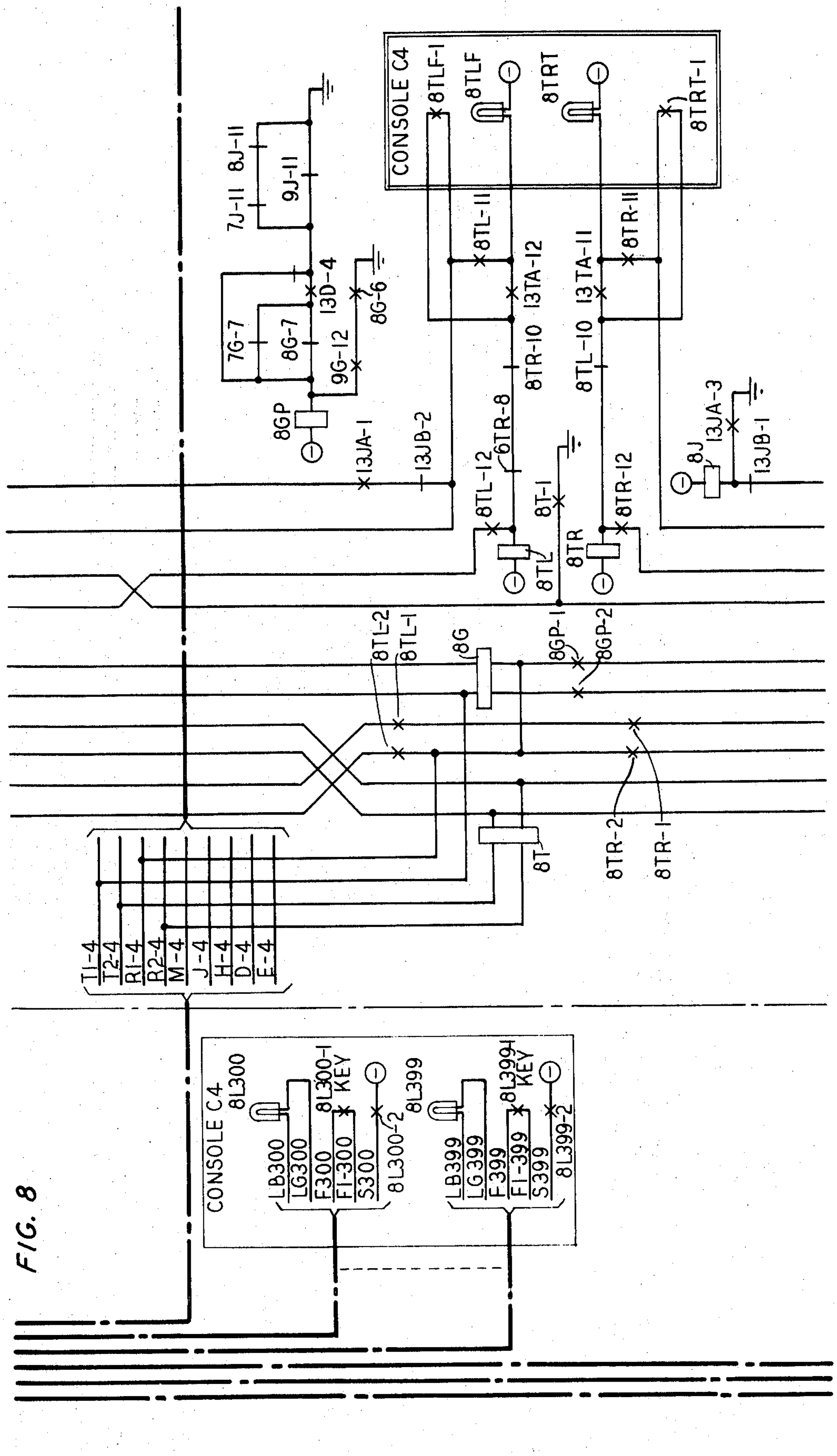
Figure 9:
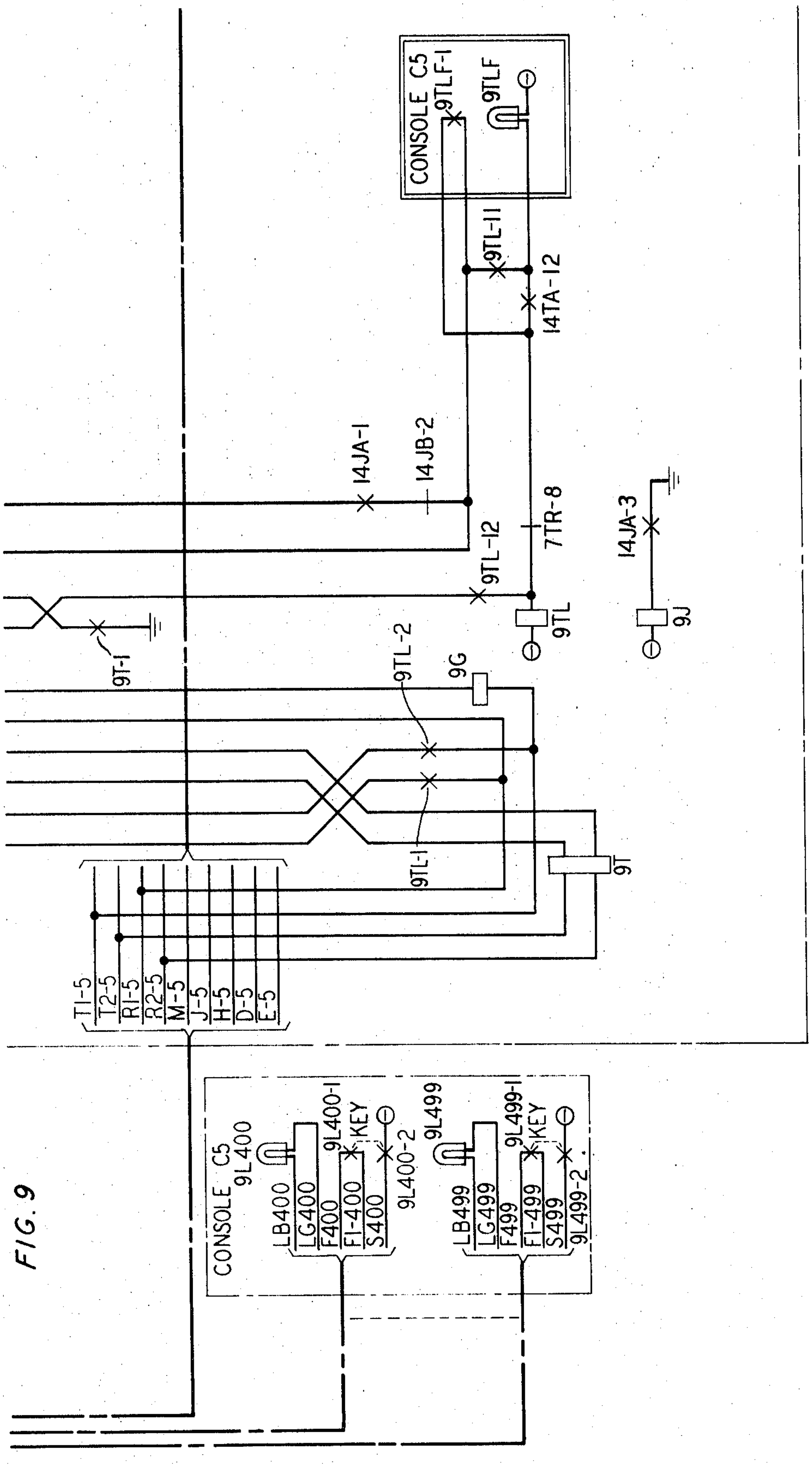

Turning now to FIG. 3, assume that a call is incoming to the answering bureau over line 3S1 and line circuit 200 to console C3, FIG. 7. Under this condition, the 7L200 lamp flashes in the manner previously described for the 5L00 lamp. Since answering supervision has been extending from console C2 to console C3, operation of the 7L200 key enables the line circuit 200 to extend the call over leads T1–3 and R1–3 to PICC 101, FIG. 7 in the manner previously described for line circuit 000. However, since console C3 is grouped to console C2, the T1–3 and R1–3 leads are extended through the 7G relay winding to FIG. 6 and through enabled make contacts 6GP–1 and 6GP–2, and the 6G relay winding to leads T1–2 and R1–2 and extended through PICC 101 to console C2, FIG. 16, and through released break contacts 11PA2–9 and 11PA2–3, capacitors C1 and C2, network and amplifier 1602 to the attendant connected to the A Jack of console C2. Accordingly, relay 16PA operates from the switching system battery which is extended through the interconnection control circuit and inductor 16A in the same manner as previously discussed for relay 15PA. In similar manner, the 6G and 7G relays are now operated since the switching system battery also flows through one of each of their windings in the manner detailed above. The importance of the operation of these relays will be more apparent from that which is contained hereinafter.

Turning again to FIG. 11 the enabling of relay 16PA enables the operation of relay 11PA1 from ground through enabled make contact 16PA–1 to battery through the winding of relay 11PA1. At the same time, ground is also extended through enabled make contacts 16PA–and 6GP–8 to battery through the winding of relay 12PA1, FIG. 12. The enabling of relays 11PA1 and 12PA1 causes the removal of ground from the H leads associated with consoles C2 and C3, respectively, in the same manner as previously discussed for the H–1 lead of console C1. Accordingly, while a call is being processed through console C3 to console C2 answering supervision is removed and other lines may not be answered from either of these consoles during this interval.

Summarizing at this point, the attendant at console C2, upon observing the flashing of the 7L200 lamp on console C3, operates the associated key from that console and is thereupon in telephonic communication via the headset at console C2, the PICC 101 and the line circuit associated with console C3 through the switching system to the calling station.

2.3 Return of Attendant to Console C3

Turning now to FIG. 12, assume that an attendant upon returning to console C3 connects the headset to the A jack. Since a call is currently in progress through console C3, as determined by the operated condition of relays 6G and 7G, the grouping arrangement is not changed as relay 6GP remains operated from ground through enabled make contacts 6G–6 and 7G–12, and relay 12JA remains released via enabled break contact 7G–1. So long as relay 6GP remains operated, relay 12PA1 also remains operated thereby preventing ground from being extended over the H–3 lead to console C3. The absence of ground on the H–3 lead, as previously noted, prevents the attendant at console C3 from selecting any other line while call is in progress even though the headset is now connected thereto. Also, since relay 12PA2 remains operated at this time, from enabled make contact 6GP–9, FIG. 11, the communication path from the C3 console, FIG. 17, remains open as previously noted, thereby preventing the attendant from being bridged to the call currently in progress. Upon termination of this call the 7G and 6G relays release, thereby releasing relay 6GP via released make contacts 7G–6 and 7G–12. Relay 6GP releasing thereupon releases relays 12PA1 and 12PA2. The release of relay 6G also enables the operation of relay 12JA which restores answering supervision to console C3.

2.4 Removal of Headsets from Consoles C2 and C3

In the event the attendants at consoles C2 and C3 both remove their headsets, the 6J and 7J relays release in the manner previously set forth. As will become more apparent from that which is to follow, the release of the relays causes the PICC 101 circuit to group console C2 to console C1. However, as will be detailed in that which is to follow, since occupied console C4 is adjacent to console C3 while console C1 is more remotely situated, the PICC 101 circuit groups console C3 with console C4.

Referring now to FIG. 5, the release of relay 6J extends ground from released break contacts 6J–12 and 11D–5 to the winding of relay 5GP. Relay 5GP operating extends ground from make contacts 10JA–12 and 5GP–3, FIG. 10, to the 11GL lamp, console C2, FIG. 11. The illumination of the 11GL lamp is an indication that console C2 is "grouped left" or grouped to console C1. Battery is also extended at this time from make contact C1. Battery is also extended at this time from make contact 5GP–10, FIG. 10, to the winding of the 11TA relay. Relay 11TA operating extends ground in the manner previously discussed over the H–2 lead to console C2, thereby enabling the selection of any line circuit connected to console C2 by the attendant at console C1.

Turning now to FIG. 7, relay 7J releasing extends a ground through release break contacts 6J–9 and 7J–1, enabled make contact 8J–11, released break contacts 12D–8 and 13D–5 to the winding of relay 7GP. Accordingly, relay 7GP in operating groups console C3 to console C4 in the manner previously discussed for consoles C2 and C1. Lamp 12GR in console C3 is illuminated at this time as an indication that console C3 is "-grouped right" to console C4.

It should be noted that console C3 is grouped to the nearest occupied console which in this case is console C4, since console C2 is also unoccupied. In similar manner console C2 is grouped to its nearest occupied console C1.

2.5 Removal of Headset from all Consoles Except Console C1

It will be observed from FIG. 21, line 4, that when consoles C2, C3, C4 and C5 are all unoccupied, grouping will be to the only available console C1. Accordingly, all grouping relays, 5GP, 6GP, 7GP, and 8GP, operate at this time in an obvious manner as shown in the preference circuits detailed on FIGS. 5, 6, 7 and 8, respectively. Assuming now that a call incoming over line circuit 200 is extended through consoles C3 and C2 and answered by the attendant at console C1. In this situation, as previously discussed, relays 5G, 6G and 7G are operated during the progress of this call. Since the call is being extended through console C2, as indicated by the operated status of relays 5G and 6G, an attendant inserting a headset therein does not receive supervisory control until the termination of the call. This follows since relay 5GP remains operated from ground through enabled make contacts 6G–12 and 5G–12, and relay 6GP remains operated from ground through enabled make contacts 6G–6 and 7G–12. Immediately upon termination of the call, the 5GP relay releases, thereby allowing the attendant at console C2 to resume control of that console. Relay 6GP, however, remains operated from ground through released break contact 7J–12, enabled make contact 6J–1 and released break contacts 11D–4 and 12D–9. Accordingly, unoccupied consoles C3, C4 and C5 are now grouped to console C2 in the manner previously discussed.

It should be noted that while consoles C3 and C2 are inhibited from changing the grouping arrangements between them during the progress of the call, no such inhibition is in effect for consoles C4 and C5 which are also grouped to console C1 during the call. For example, assume that console C1 is in the process of answering a call incoming 23 over line 200 from console C3 and that a headset is inserted in the A jack of console C4. Under these conditions, relay 12D is operated as previously described and relay 13JA operates via released break contact 8G–1. Accordingly, relay 8J operates and relay 9J remains released. Relay 7GP, which controls the grouping between console C4 and console C3, releases when ground is removed from its winding via released make contact 8G–6, enabled transfer contact 12D–8 and enabled bread contacts 7G–5 and 6G–7. Relay 8GP is operated from ground through released break contacts 9J–11 and 13D–4 to battery through the winding of the relay. Supervisory control is thus given to console C4 for both consoles C4 and C5 immediately upon the connection of the attendant's headset to console C4 even while the assisting attendant at console C1 is busy answering a call.

2.6 Connection of Adjustment Consoles in a Teaming Mode

In the situation where an idle attendant, such as an attendant at console C2, desires to assist a busy attendant, such as an attendant at console C3, the team right key (TRT) is operated from console C2 so as to interconnect the consoles in a teaming mode.

Turning now to FIG. 6, the operation of key 6TRT from console C2 provides an operate path for the 6TR relay from battery through the winding of the relay and released break contacts 8TL–8 and 6TL–10 (these contacts insure that console C2 is not currently in the process of giving assistance to console C1 or receiving assistance from console C4) through the enabled contact 6TRT–1 of the teaming key to FIG. 7, through released break contact 12JB–2 and enabled make contact 12JA–1 back to FIG. 6, through released break contact 11JB–1 and enabled make contact 11JA–3 to ground. Lamp 6TRT in console C2 is now illuminated, from ground, through enabled make contact 6TR–11 and through the filament of the lamp to battery, as an indication to the attendant at console C2 that assistance may now be given to console C3.

Figure 11:
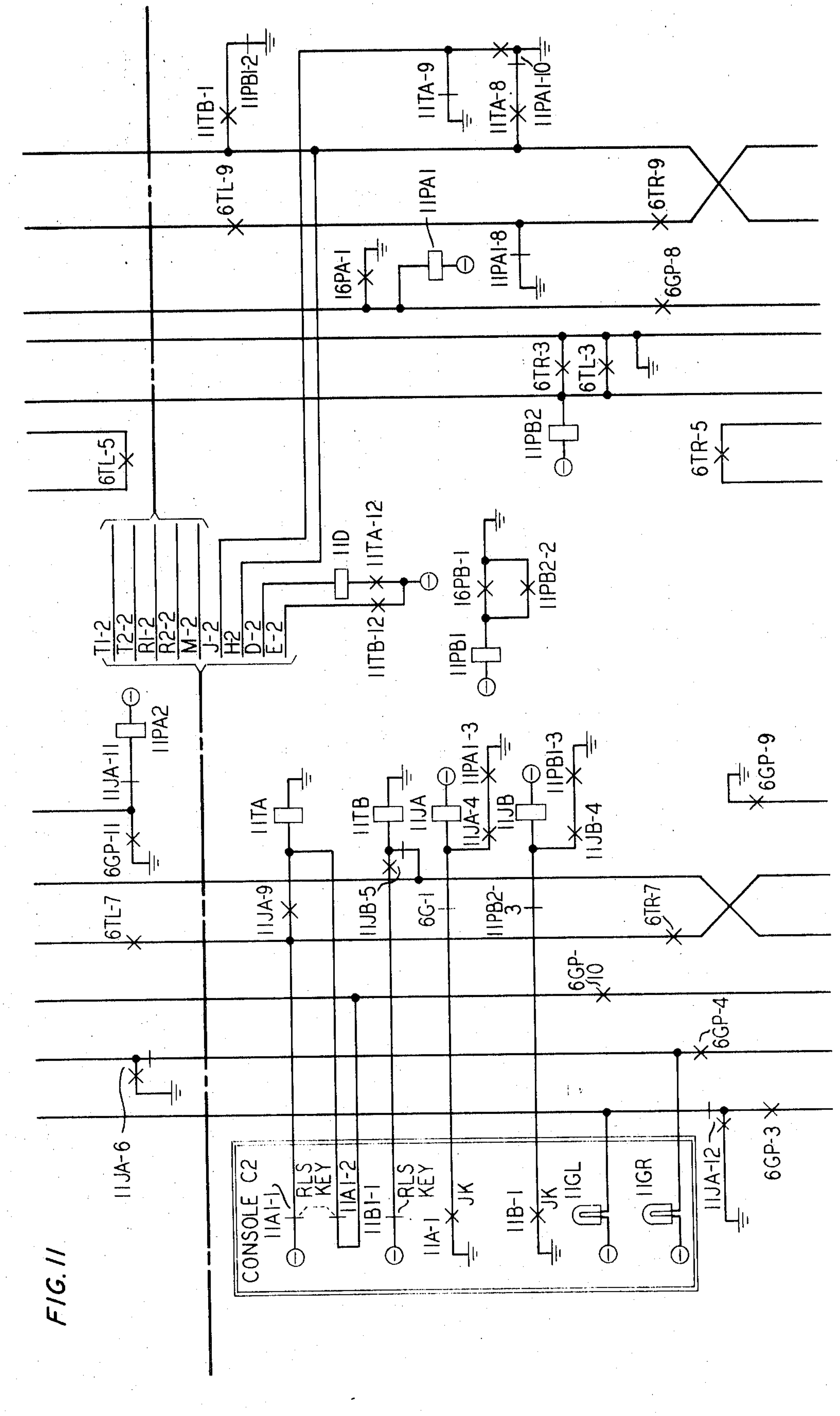

Turning now to FIG. 11, the operation of relay 6TR enables the operation of relay 11PB2 from ground through enabled make contact 6TR–3 to battery through the winding of the relay. The enabling of relay 11PB2 prevents the operation of relay 11JB, via enabled break contact 11PB2–3, and accordingly prevents an assisting attendant connected to the B jack of console C2 from interfering with the teamwork function between the consoles. At the same time, battery is extended from console C2, via released break contact 11A1–1 of the release key and enabled make contact 6TR–7 to FIG. 12 and through released break contact 12JB–5 and the winding of relay 12TB to ground. Accordingly, relay 12TB operates and provides battery on lead E–3 from enabled make contact 12TB–12. Since console C3 is currently busy, ground is present on lead J–3, in the manner previously described, via enabled make contact 12PA1–10. Ground is also present on lead H–3 from FIG. 11 released break contact 11PA1–8 and enabled make contact 6TR–9.

Turning now to FIG. 7, assume that a call is incoming over line circuit 200. As previously discussed lamp 7L200 is illuminated in a flashing manner under this condition. The attendant at console C2 may answer the call on line 200 by momentarily operating the 7L200 key on console C3, even though the attendant at console C3 is currently engaged in a call. In the manner previously described for line circuit 000, FIG. 2, ground which is present on the H lead is extended through the operated make contact 7L200–1 of the pickup key to the winding of the appropriate W relay. As detailed in FIG. 2, since ground also is present now on the J lead, relay 2D operates in an obvious manner. The line circuit in all other respects functions the same as is detailed for line circuit 000. However, the incoming line, instead of being connected to the PICC 101, FIG. 7, via the T1 and R1 leads is extended thereto via the T2 and R2 leads by the operation to transfer contacts 2D–3 and 2D–4 (FIG. 2). The incoming line is thereby extended through the winding of relay 7T (FIG. 7) to FIG. 6 and through enabled make contacts 6TR–2 and 6TR–1 and leads T1–2 and R1–2 to FIG. 16 and to the operator's headset connected to the A jack of console C2 in the same manner as previously discussed for the grouping operation.

Returning now to FIG. 7, central office battery, which is extended to relay 7T in the manner set forth above, causes the relay to operate and remain operated throughout the call. Accordingly, ground is extended from enabled make contact 7T–1 to FIG. 6 and through enabled make contact TR–12 as a lock ground of relay 6TR. The team right (TRT) key is released at this time and relay 6TR therefore remains operated only as long as relay 7T remains operated. Accordingly, upon completion of the call, relays 7T and 6TR release thereby removing the teamwork interconnection between the consoles.

It should be noted at this point that even while consoles C2 and C3 are interconnected for teamwork operation, the attendant at console C3 cannot assist console C2 unless the team left (TL) key at console C3 is operated. This follows since, as shown in FIG. 11, relay 11PB1 is operated via enabled make contact 11PB2–2. Ground is thereby removed from the H–2 lead by enabled break contact 11PB1–2. Accordingly, as detailed previously, the line circuits associated with console C2 remain normal, even if an attempt is made to answer a call incoming over one of the associated lines. The operation of the TLF key at console C3, FIG. 7, enables relay 7TL, in the manner previously discussed, for relay 6TR. The operation of relay 7TL provides ground for the H–2 lead, FIG. 11, from FIG. 12 and enabled make contact 7TL–9 and released break contact 12PA1–8. As previously discussed, the attendant at console C3 thereby may assist the attendant at console C2 by answering one incoming call directed thereto, and may do so without also forcing the teamed console to also team in return.

2.7 Conclusion

While the equipments of this invention have been described with reference to a particular embodiment in an arrangement whereby console positions are interconnected with each other in a telephone answering system, it is to be understood that such an embodiment is intended only to be illustrative of the present invention and that numerous other arrangements may be devised by those skilled in the art without departing from the spirit and scope of the invention.

We claim:

1. In a telephone system:
- a plurality of adjacent attendant positions;
- a headset for each said position;
- means for disconnecting said headset from said position;
- means responsive to disconnection of a said headset from one of said positions for detecting the occupied status of each attendant position next adjacent to said one position; and
- means controlled by said detecting means for interconnecting said one position with an occupied one of said adjacent positions.

2. In a telephone system the combination set forth in claim 1 wherein said interconnecting means includes means for interconnecting said one position with a preselected one of said adjacent positions when each of said adjacent positions is occupied.

3. In a telephone answering bureau:
- a plurality of numerically designated attendant positions;
- attendants' headsets for said positions;
- means for disconnecting said headsets from said positions; and
- means responsive to the disconnection of an attendant's headset from one of said positions for interconnecting said one position with the next designated position in one direction from said one position containing an attendant's headset.

4. A telephone answering bureau in accordance with claim 3 wherein said interconnecting means includes means for determining whether the positions means includes means for determining whether the positions next numerically designated in said one and the opposite direction from said one position are occupied and means jointly responsive to a determination that said next position in said opposite direction is occupied and said next position in said one direction is unoccupied for interconnecting said one position with said next position in said opposite direction.

5. In a telephone system:
- a plurality of numerically designated attendant positions;
- a headset for each said position;
- means for detecting the occupied status of said positions;
- means responsive to the disconnection of a said headset from one of said positions for grouping said one position with the next lower designated occupied position;
- means controlled by said detecting means for inhibiting said grouping whenever a higher designated adjacent position is occupied and a lower designated adjacent position is unoccupied; and
- means responsive to the enabling of said inhibiting means for grouping said one position with said occupied higher designated adjacent position.

6. A telephone system:
- the combination as set forth in claim 5 wherein said one position includes incoming line circuits responsive to incoming calls;
- means for identifying unoccupied positions numerically designated between said one position and said grouped occupied position;
- means for extending one of said incoming line circuits through said one position and through any said identified unoccupied position to said grouped occupied position; and
- means for marking any position through which said incoming line circuit is extended.

7. A telephone system, the combination as set forth in claim 6 further comprising:
- second grouping means responsive to the disconnection of a said headset from another of said positions for connecting said another position with said grouped occupied position; and
- means responsive to the reconnection of a said headset to said another position for releasing said second grouping means while said grouped occupied position is marked.

8. In combination a telephone answering bureau comprising:
- a plurality of attendant consoles;
- a headset for each of said consoles;
- means for disconnecting said headset from said console;
- a plurality of incoming lines connected to said consoles;
- means for completing a call from one of said lines to a headset connected to a console associated therewith;
- means responsive to the disconnection of said headset from said associated console for interconnecting said associated console with an adjacent console to which a headset is connected;
- means enabled by said interconnecting means for completing a call from said one line to said connected headset of said adjacent console;
- means responsive to the reconnection of said headset to said associated console for releasing said interconnecting means; and
- means for inhibiting said releasing means while said completed call is completed to said adjacent console.

9. A telephone answering bureau in accordance with claim 8 wherein said inhibiting means further comprises means for maintaining said reconnected headset inoperative while said call is completed to said adjacent console.

10. In a telephone answering bureau comprising:
- a plurality of attendant consoles;
- a headset for each of said consoles;
- a plurality of incoming lines connected to said consoles;
- means detecting the occupied status of said consoles;
- means responsive to the operation of a key at an occupied one of said consoles for selectively interconnecting said console with an occupied adjacent console;
- means for completing a call from one of said lines to a headset connected to said adjacent console;
- means enabled by said interconnecting means for extending a call from said adjacent console to a headset connected to said one console while a call is completed to a headset connected to said adjacent console;
- means for detecting the completion of said extended call; and
- means operative in response to said detecting means for releasing said interconnecting means.

11. A telephone answering bureau in accordance with claim 10 wherein said interconnecting means further comprises means for preventing calls from being extended to said adjacent console from said one console.

12. In a telephone answering bureau comprising:

a plurality of numerically designated attendant consoles;

a headset for each of said consoles;

a plurality of incoming lines connected to said consoles;

means for detecting the occupied status of said consoles;

means responsive to the disconnection of an attendant's headset from one of said consoles for grouping said one console with the next lower designated console containing an attendant's headset.

means responsive to the operation of a key at an occupied one of said consoles for selectively teaming said console with an occupied adjacent console;

means for completing a call from one of said lines to a headset connected to said adjacent console;

means enabled by said teaming means for extending a call from said adjacent console to a headset connected to said one console while a call is completed to a headset connected to said adjacent console;

means for detecting the completion of said extended call; and means operative in response to said detecting means for releasing said teaming means.